(12) United States Patent
Mori et al.

(10) Patent No.: US 12,103,116 B2
(45) Date of Patent: *Oct. 1, 2024

(54) ALUMINUM BRAZING SHEET FOR FLUX-FREE BRAZING

(71) Applicant: MA Aluminum Corporation, Minato-ku (JP)

(72) Inventors: Yoshiki Mori, Susono (JP); Hideyuki Miyake, Susono (JP); Michihide Yoshino, Susono (JP); Shohei Iwao, Sunto-gun (JP); Masakazu Edo, Susono (JP)

(73) Assignee: MA Aluminum Corporation, Minato-ku (JP)

( * ) Notice: Subject to any disclaimer, the term of this patent is extended or adjusted under 35 U.S.C. 154(b) by 504 days.

This patent is subject to a terminal disclaimer.

(21) Appl. No.: 17/424,384

(22) PCT Filed: Sep. 25, 2019

(86) PCT No.: PCT/JP2019/037647
§ 371 (c)(1),
(2) Date: Jul. 20, 2021

(87) PCT Pub. No.: WO2020/152912
PCT Pub. Date: Jul. 30, 2020

(65) Prior Publication Data
US 2022/0072665 A1    Mar. 10, 2022

(30) Foreign Application Priority Data

Jan. 23, 2019  (WO) .................. PCT/JP2019/002119

(51) Int. Cl.
*B23K 35/28*    (2006.01)
*B23K 35/02*    (2006.01)
(Continued)

(52) U.S. Cl.
CPC ........ *B23K 35/288* (2013.01); *B23K 35/0238* (2013.01); *B32B 15/00* (2013.01);
(Continued)

(58) Field of Classification Search
CPC .............. B23K 35/288; B23K 35/0238; B32B 15/016
(Continued)

(56) References Cited

U.S. PATENT DOCUMENTS 11,007,609 B2 *  5/2021  Itoh .................... C22C 21/02
11,020,824 B2    6/2021  Mori
(Continued)

FOREIGN PATENT DOCUMENTS

CN    102251154 A    11/2011
CN    102251155 A    11/2011
(Continued)

OTHER PUBLICATIONS

International Search Report issued Dec. 17, 2019 in PCT/JP2019/037647 filed Sep. 25, 2019, 1 page.
(Continued)

*Primary Examiner* — Katherine A Christy
(74) *Attorney, Agent, or Firm* — Oblon, McClelland, Maier & Neustadt, L.L.P.

(57) ABSTRACT

An aluminum brazing sheet has a multilayer structure of two or more layers of at least a core material and a brazing material, wherein an Al—Si—Mg—Bi-based brazing material containing, by mass %, 0.01% to 2.0% of Mg, 1.5% to 14.0% of Si, and 0.005% to 1.5% of Bi is clad on one surface or both surfaces of the core material to be located at an outermost surface of the aluminum brazing sheet, in the Al—Si—Mg—Bi based brazing material, there are more than 10 Mg—Bi-based compounds having a diameter of 0.01 μm or more and less than 5.0 μm when observed in a surface layer plane direction and there are less than 2
(Continued)

Mg—Bi-based compounds having a diameter of 5.0 μm or more, and in the brazing material, there are less than 5 Bi particles having a diameter of 5.0 μm or more when observed in the surface layer plane direction.

20 Claims, 2 Drawing Sheets

(51) Int. Cl.
| | |
|---|---|
| *B32B 15/00* | (2006.01) |
| *B32B 15/01* | (2006.01) |
| *C22C 21/02* | (2006.01) |
| *C22C 21/10* | (2006.01) |

(52) U.S. Cl.
CPC ............ *B32B 15/01* (2013.01); *B32B 15/016* (2013.01); *C22C 21/02* (2013.01); *C22C 21/10* (2013.01)

(58) Field of Classification Search
USPC ......................................................... 428/654
See application file for complete search history.

(56) References Cited

U.S. PATENT DOCUMENTS

| | | | |
|---|---|---|---|
| 11,027,373 | B2 | 6/2021 | Mori |
| 11,045,911 | B2 | 6/2021 | Mori |
| 2017/0205160 | A1 | 7/2017 | Yanagawa et al. |
| 2018/0159796 | A1 | 6/2018 | Wang et al. |
| 2018/0169798 | A1* | 6/2018 | Izumi .................. B23K 35/288 |

FOREIGN PATENT DOCUMENTS

| | | | |
|---|---|---|---|
| CN | 104395028 | A | 3/2015 |
| CN | 104626674 | A | 5/2015 |
| CN | 106661677 | A | 5/2017 |
| CN | 107849647 | A | 3/2018 |
| CN | 108884522 | A | 11/2018 |
| CN | 109070279 | A | 12/2018 |
| CN | 106881511 | B | 4/2019 |
| CN | 110087822 | A | 8/2019 |
| CN | 110691857 | A | 1/2020 |
| CN | 110719965 | A | 1/2020 |
| CN | 110691857 | B | 12/2020 |
| JP | 5-337681 | A | 12/1993 |
| JP | 8-120380 | A | 5/1996 |
| JP | 8-120384 | A | 5/1996 |
| JP | 8-120386 | A | 5/1996 |
| JP | 11-47919 | A | 2/1999 |
| JP | 2001-105174 | A | 4/2001 |
| JP | 4547032 | B1 | 9/2010 |
| JP | 2012-50992 | A | 3/2012 |
| JP | 2012-50993 | A | 3/2012 |
| JP | 2014-37576 | A | 2/2014 |
| JP | 2014-50861 | A | 3/2014 |
| JP | 2014-155955 | A | 8/2014 |
| JP | 104561698 | A | 9/2015 |
| JP | 2018-103260 | A | 7/2018 |
| JP | 6405020 | B1 | 10/2018 |
| JP | 2018-196896 | A | 12/2018 |
| JP | 6726370 | B1 | 7/2020 |
| JP | 7132362 | B2 | 9/2022 |
| WO | WO 2018/123203 | A1 | 7/2018 |
| WO | WO 2018/216773 | A1 | 11/2018 |

OTHER PUBLICATIONS

International Search Report issued Mar. 24, 2020 in PCT/JP2019/051412 filed Dec. 27, 2019, 2 pages.

Chinese Search Report issued Aug. 28, 2020 in Chinese Patent Application No. 201980002196.9 filed Jan. 23, 2019, 8 pages (with English Translation).

Chinese Office Action and Search Report issued Mar. 30, 2022 in Patent Application No. 201980089868.4 (with English language translation), 15 pages.

Japanese Office Action issued Mar. 7, 2023 in Japanese Application 2020-567363 (with English Translation), 4 pages.

Office Action mailed Dec. 22, 2022, in co-pending U.S. Appl. No. 17/424,300.

Extended European Search Report issued Oct. 5, 2022 in European Patent Application No. 19911474.5, 9 pages.

Combined Chinese Office Action and Search Report issued Jan. 25, 2022 in Patent Application No. 201980089683.3 (with partial English language translation), 11 pages.

International Search Report issued on Dec. 17, 2019 in PCT/JP2019/037644 filed on Sep. 25, 2019, 2 pages.

Combined Chinese Office Action and Search Report issued on Aug. 20, 2020 in Patent Application No. 2019800020735 (with English language translation of Search Report only), 8 pages.

* cited by examiner

JOINT WIDTH EVALUATION POSITIONS

ALUMINUM BRAZING SHEET FOR FLUX-FREE BRAZING

CROSS-REFERENCE TO RELATED APPLICATIONS

The present application is the national stage of international application PCT/JP2019/037647, filed on Sep. 25, 2019, and claims the benefit of the filing date of international application PCT/JP2019/002119, filed on Jan. 23, 2019.

TECHNICAL FIELD

This invention relates to an aluminum brazing sheet for flux-free brazing joined without a flux.

BACKGROUND ART

As the size and weight of aluminum heat exchangers for vehicles such as radiators have been reduced, thinning and high-strengthening of aluminum materials have proceeded. In the manufacturing of aluminum heat exchangers, brazing is performed to join joints. However, in a brazing method using the current mainstream fluoride-based flux, the flux reacts with Mg in a material to be deactivated and is likely to cause brazing defects, so that the use of a Mg-added high strength member is limited. Therefore, a brazing method of joining a Mg-added aluminum alloy without using a flux is desired.

In flux-free brazing using an Al—Si—Mg brazing material, Mg in the brazing material that has been melted and activated reduces and decomposes an Al oxide film ($Al_2O_3$) on the surface of a joint, whereby joining is achieved. In a closed surface joint or the like, a good joined state is obtained at a joint where brazing sheets having brazing materials are combined by a decomposition action of an oxide film by Mg, and a joint where a brazing sheet and a member (bare material) to be joined which does not have a brazing material are combined.

CITATION LIST

Patent Literature

[Patent Literature 1]
Japanese Unexamined Patent Application, First Publication No. 2014-50861

SUMMARY OF INVENTION

Technical Problem

However, with a joint shape that is easily affected by an atmosphere, such as a tube-fin joint, a MgO film tends to grow on the surface of a Mg-added brazing material. Since the MgO film is a stable oxide film that is less likely to be decomposed, joining is significantly impeded. Therefore, a flux-free brazing method capable of obtaining a stable joined state at a joint having an open portion is strongly desired.

As a method for stabilizing a joined state of flux-free brazing, for example, a technique in which an Al—Si—Mg—Bi-based brazing material described in Patent Literature 1 is used to control a distributed state of Bi particles and Mg—Bi compound particles in the brazing material is proposed. According to this technique, it is considered that by dispersing solely Bi or a Bi—Mg compound having an equivalent circle diameter of 5.0 to 50 μm in the brazing material, these compounds are exposed to the surface of the brazing material during the manufacturing of a material, and the formation of an oxide film at the exposed portion is thus suppressed, so that flux-free brazability within a short braze heating time is improved.

However, it is difficult to say that joinability that is stable enough to replace the brazing method using the current mainstream fluoride-based flux is obtained, and a further technical improvement is necessary for wide application to general heat exchangers.

Therefore, the present invention conducted intensive examinations in view of the above problems, and as a result, found that it is most important to uniformly concentrate Bi on the surface during braze melting in order to further improve brazability in a Bi-added Al—Si—Mg-based brazing material. In addition, although a coarse Mg—Bi compound of 5 μm or more is effective in suppressing the generation of an oxide film during manufacturing of a material, it is difficult to dissolve the Mg—Bi compound during braze heating, but by dispersing a rather fine Bi—Mg compound of 0.1 μm or more and less than 5.0 μm to a predetermined number density or more, the Mg—Bi compound is reliably dissolved during the braze heating to generate metal Bi. As the generated Bi is uniformly concentrated on the surface, good brazability is obtained. Furthermore, it was found that when coarse Bi particles of 5.0 μm or more are present in the brazing material before brazing, Bi melts in a low temperature range in a brazing temperature rising process and concentrates on the material surface, and Bi oxides and the like are deposited on the material surface before braze melting and impede joining, so that it is important to suppress coarse Bi particles before brazing.

The present invention has been made based on the above circumstances, and an object thereof is to provide an aluminum brazing sheet for flux-free brazing capable of obtaining good joinability without a flux.

Solution to Problem

The present inventors found that by finely and densely dispersing a Mg—Bi-based compound in an Al—Si—Mg—Bi-based brazing material before brazing, an excellent joined state is obtained in flux-free brazing in a non-oxidizing atmosphere without depressurization.

That is, among aluminum brazing sheets for flux-free brazing according to the present invention, a first aspect is an aluminum brazing sheet for flux-free brazing provided for brazing in a non-oxidizing atmosphere without depressurization and using a flux, which is a brazing sheet having a multilayer structure of two or more layers of at least a core material and a brazing material, wherein an Al—Si—Mg—Bi-based brazing material containing, by mass %, 0.01% to 2.0% of Mg, 1.5% to 14.0% of Si, and 0.005% to 1.5% of Bi is clad on one surface or both surfaces of the core material to be located at an outermost surface of the aluminum brazing sheet, in the Al—Si—Mg—Bi based brazing material, there are more than 10 Mg—Bi-based compounds having a diameter of 0.01 μm or more and less than 5.0 μm in terms of equivalent circle diameter per 10,000-μm² visual field and there are less than 2 Mg—Bi-based compounds having a diameter of 5.0 μm or more per 10,000-μm² visual field when observed in a surface layer plane direction, and in the brazing material, there are less than 5 Bi particles having a diameter of 5.0 μm or more in terms of equivalent circle diameter per 10,000-μm² visual field when observed in the surface layer plane direction.

In an invention of an aluminum brazing sheet for flux-free brazing of another aspect, in the invention of the above aspect, in the Al—Si—Mg—Bi-based brazing material, a number of Si particles having a diameter of 1.75 μm or more in terms of equivalent circle diameter is 25% or more with respect to a number of Si particles having a diameter of 0.8 μm or more in terms of equivalent circle diameter when observed in the surface layer plane direction.

In an invention of an aluminum brazing sheet for flux-free brazing of another aspect, in the invention of the above aspect, an area ratio of Si particles contained in the Al—Si—Mg—Bi-based brazing material and having a diameter of 1.75 μm or more in terms of equivalent circle diameter to a surface area is in a range of 0.1% to 1.5%.

In an invention of an aluminum brazing sheet for flux-free brazing of another aspect, in the invention of the above aspect, in the Al—Si—Mg—Bi-based brazing material, an atomic composition ratio between Mg and Bi is Mg/Bi=1.5 or more.

In an invention of an aluminum brazing sheet for flux-free brazing of another aspect, in the invention of the above aspect, in the Al—Si—Mg—Bi-based brazing material, a Ca content as impurities is in 100 ppm or less in terms of mass ppm.

In an invention of an aluminum brazing sheet for flux-free brazing of another aspect, in the invention of the above aspect, the Al—Si—Mg—Bi-based brazing material further contains 0.1% to 9.0% of Zn by mass %.

In an invention of an aluminum brazing sheet for flux-free brazing of another aspect, in the invention of the above aspect, the core material contains, by mass %, one or two or more of Si: 0.05% to 1.2%. Mg: 0.01% to 2.0%, Mn: 0.1% to 2.5%, Cu: 0.01% to 2.5%, Fe: 0.05% to 1.5%, Zr: 0.01% to 0.3%, Ti: 0.01% to 0.3%, Cr: 0.01% to 0.5%, Bi: 0.005% to 1.5%, and Zn: 0.1% to 9.0% a remainder consisting of Al and inevitable impurities.

In an invention of an aluminum brazing sheet for flux-free brazing of another aspect, in the invention of the above aspect, the core material contains, by mass %, Si: 0.05% to 1.2% and Mg: 0.01% to 2.0%, and further contains one or two or more of Mn: 0.1% to 2.5%, Cu: 0.01% to 2.5%, Fe: 0.05% to 1.5%, Zr: 0.01% to 0.3%, Ti: 0.01% to 0.3%, Cr: 0.01% to 0.5%, Bi: 0.005% to 1.5%, and Zn: 0.1% to 9.0%, and including a remainder consisting of Al and inevitable impurities.

In an invention of an aluminum brazing sheet for flux-free brazing of another aspect, in the invention of the above aspect, the core material is clad with a sacrificial material, and the sacrificial material contains, by mass %, Zn: 0.1% to 9.0%, and further contains one or two or more of Si: 0.05% to 1.2%, Mg: 0.01% to 2.0%, Mn: 0.1% to 2.5%, Fe: 0.05% to 1.5%, Zr: 0.01% to 0.3%, Ti: 0.01% to 0.3%, Cr: 0.01% to 0.5%, and Bi: 0.005% to 1.5%.

Hereinafter, the composition and the like specified in the present invention will be described below. In addition, contents described are shown in mass ratio.

Brazing Material (Brazing Material Layer)

Mg: 0.01% to 2.0%

Mg reduces and decomposes an Al oxide film ($Al_2O_3$). However, when the Mg content is too small, the effect is insufficient. On the other hand, when the Mg is excessively contained, Mg reacts with oxygen in a brazing atmosphere and generates MgO that impedes joining, and the material becomes hard and brittle, making it difficult to manufacture the material. Therefore, the Mg content is set to be in the above range.

Si: 1.5% to 14.0%

Si forms a molten braze during brazing and forms a fillet at a joint. However, when the Si content is too small, the molten braze for forming the fillet is insufficient. On the other hand, when S is excessively contained, not only be the effect saturated, but also the material becomes hard and brittle, making it difficult to manufacture the material. Therefore, the S content is set to be in the above range. For the same reason, it is desirable that the Si content is set to 3.0% at the lower limit and 12.0% at the upper limit.

Bi: 0.005% to 1.5%

Bi concentrates on the surface of the material in a brazing temperature rising process and suppresses the growth of a dense oxide film. Furthermore, Bi lowers the surface tension of the molten braze and thus improves a gap filling property. However, when the Bi content is too small, the effect is insufficient. On the other hand, when the Bi is excessively contained, not only be the effect saturated, but also Bi oxides are easily generated on the material surface and joining is impeded. Therefore, the Bi content is set to be in the above range. For the same reason, it is desirable that the Bi content is set to 0.05% at the lower limit and 0.5% at the upper limit.

Ca: 100 ppm or Less

Ca is usually contained as an inevitable impurity at a few hundred ppm or less. However, since Ca forms a high melting point compound with Bi and lowers the action of Bi, it is desirable to limit the Ca content. When the Ca content exceeds 100 ppm, the action of Bi is lowered and the brazability becomes insufficient. Therefore, it is desirable to set the upper limit thereof to 100 ppm. For the same reason, it is more desirable to set the Ca content to 10 ppm or less.

Zn: 0.1% to 9.0%

Zn provides a sacrificial anticorrosive effect by lowering the potential of the material, and is therefore contained as desired. However, in a case where Zn is contained, when the Zn content is too small, the sacrificial anticorrosive effect becomes insufficient. On the other hand, when the Zn content is too large, the effect is saturated. Therefore, in a case where Zn is contained, the Zn content is set to be in the above range.

For the same reason, it is desirable that the Zn content is set to 0.5% at the lower limit and 7.0% at the upper limit. Even in a case where Zn is not positively added, Zn may be contained as an impurity in less than 0.1%.

In addition, the brazing material may contain, as other elements, one or more of 2.0% or less of each of In, Sn, and Mn, 1.0% or less of each of Fe, Ni, Ce, and Se, 0.3% or less of each of Be, Na, Sb, Ti, Zr, P, S, K, and Rb, and the like.

Mg—Bi-Based Compounds: Those Having a Diameter of 0.01 to Less than 5.0 μm in Terms of Equivalent Circle Diameter are More than 10 in Number Per 10,000-$\mu m^2$ Visual Field Dispersion of fine Mg—Bi-based compounds facilitates uniform concentration of Bi on the material surface when the compound melts in the brazing temperature rising process, and thus suppresses the growth of a dense oxide film. When the compounds are 10 or less in number, the effect of suppressing the dense oxide film becomes insufficient and the brazability is lowered. For the same reason, it is more desirable that the number thereof is 20 or more.

The number of the Mg—Bi-based compounds on the surface of the brazing material is obtained by subjecting the surface of the brazing material of the produced material to a mirror finish with 0.1-μm abrasive grains, performing fully automatic particle analysis using an electron beam microanalyzer (EPMA), producing a thin film from the surface of a brazing material layer, which is cut, by performing mechanical polishing and electrolytic polishing in order to measure fine compounds of 1 μm or less, observing the thin film with a transmission electron microscope (TEM), and counting the number of particles of the Mg—Bi-based compounds of 0.01 to 5.0 μm in an observation visual field of 10,000 μm² (100-μm square) in a surface direction.

As means for finely and densely distributing the Mg—Bi-based compounds, adjustment can be achieved by appropriately combining, during casting, performing the casing at a high cooling rate from a high molten metal temperature, during hot rolling, taking a large total reduction rate of a certain level or more, taking a long rolling time in a high temperature range, reducing a hot rolling finish temperature by a certain level or more and increasing the subsequent cooling rate, and the like.

Mg—Bi-Based Compounds: Those Having a Diameter of 5.0 μm or More in Terms of Equivalent Circle Diameter are Less than 2 in Number Per 10,000-μm² Visual Field Coarse Mg—Bi-based compounds are difficult to melt during the brazing temperature rising process, and since Bi is difficult to concentrate uniformly on the material surface, the effect of suppressing the growth of the oxide film is low. In addition, as coarse compounds are generated, the generation of the fine Mg—Bi compounds of less than 5.0 μm is reduced. Therefore, the effect of suppressing the growth of the oxide film is reduced.

The number of the Mg—Bi-based compounds on the surface of the brazing material can be obtained by the above-described fully automatic particle analysis using the EPMA. As means for suppressing the generation of the coarse Mg—Bi-based compounds, similarly to the above-described conditions, adjustment can be achieved by appropriately combining, during casting, performing the casing at a high cooling rate from a high molten metal temperature, during hot rolling, taking a large total reduction rate of a certain level or more, taking a long rolling time in a high temperature range, reducing a hot rolling finish temperature by a certain level or more and increasing the subsequent cooling rate, and the like.

Bi Particles: Those Having a Diameter of 5.0 μm or More in Terms of Equivalent Circle Diameter are Less than 5 in Number Per 10,000-μm² Visual Field When Bi particles are present in the brazing material, Bi melts from 271° C. which is the melting point of Bi, in the brazing temperature rising process and concentrates on the material surface. However, since the temperature is in a low temperature range in the brazing temperature rising process, Bi is oxidized and deposited on the material surface until the brazing material melts, the oxide film becomes unstable at an early stage, and re-oxidation easily proceeds, so that joining is impeded. Accordingly, it is difficult to obtain a good joined state. In addition, since Bi is consumed by oxidation, the effect of reducing the surface tension of the molten braze is reduced.

At this time, it is possible to prevent these problems by producing the material so that the solely Bi is rarely present in the brazing material before brazing. Specifically, by causing the Bi particles having a diameter of 5.0 μm or more in terms of equivalent circle diameter contained in the Al—Si—Mg—Bi-based brazing material to be less than 5 in number per 10,000-μm² visual field when observed in a surface layer plane direction before brazing, Bi is rarely consumed by oxidation or the like, and the effect of improving the brazability by the addition of Bi is increased.

The number of Bi particles on the surface of the brazing material can be obtained by subjecting the surface of the brazing material of the produced material to a mirror finish with 0.1-μm abrasive grains, and performing fully automatic particle analysis thereon using an electron beam microanalyzer (EPMA).

In addition, as means for suppressing the generation of the Bi particles, adjustment can be achieved by appropriately combining the mixing ratio of Mg and Bi of an alloy, a molten metal temperature and a cooling rate during casting, and homogenization treatment conditions. As the molten metal temperature during the casting decreases and the cooling rate during the casting decreases, the number of Bi particles tends to increase. In addition, as the homogenization treatment conditions include a lower temperature and a shorter period of time, similarly, the number of Bi particles tends to increase.

Distribution of Si Particles on Surface Layer Plane of Brazing Material (1) Among Si Particles Having an Equivalent Circle Diameter of 0.8 μm or More, the Number of Those Having an Equivalent Circle Diameter of 1.75 μm is 25% or More In carrying out the present invention, it is preferable that relatively coarse Si particles are present on the surface of the brazing material. Usually, a dense oxide film such as $Al_2O_3$ is present on the surface of an aluminum material, and this further grows into a thick film in a brazing heat treatment process. The general view is that the greater the thickness of the oxide film, the stronger the tendency to impede a destructive action of the oxide film. In the present invention, since coarse Si particles are present on the surface of the brazing material, a dense oxide film of aluminum does not grow on the surface of the coarse Si particles, and this site acts as an oxide film defect on the surface of the aluminum material.

That is, even if the oxide film on the surface of the aluminum material becomes a thick film during the brazing heat treatment, exudation or the like of the brazing material occurs from the Si particle parts, and the oxide film destruction action proceeds from these sites. The term "Si particles" mentioned here includes Si particles of a solely Si component in the composition, and also includes, for example, Fe—Si-based compounds and Al—Fe—Si-based intermetallic compounds primarily containing Fe—Si. In the description of the present invention, these are referred to as Si particles for convenience. Specifically, in a case where the Si particles on the surface of the brazing material are regarded as equivalent circle diameters and the number of Si particles of 0.8 μm or more is counted, when those of 1.75 μm or more are present in 25% or more, this effect is sufficiently obtained. Here, the surface of the brazing material means the surface of the aluminum alloy excluding the oxide film, and the above conditions may be satisfied in any planar direction in a depth range up to 10 μm.

When the size of the Si particles on the surface of the brazing material is too small, the effect of acting as a defective portion of the oxide film becomes insufficient. Therefore, the number of Si particles of 1.75 μm or more is set to 25% or more of the number of Si particles of 0.8 μm or more. When the number thereof is less than 25%, the effect of acting as a defective portion of the oxide film becomes insufficient.

Regarding the distribution of the Si particles of the brazing material, the size and area ratio of the Si particles can be controlled by a solidification rate during the casting, the temperature and time of the homogenization treatment, a maximum reduction rate during the hot rolling, and the like.

(2) Area Ratio of Si Particles Having Equivalent Circle Diameter of 1.75 μm or More to Surface Area is 0.1% to 1.5%

In a case where the distribution density of the Si particles is low, portions where exudation of the brazing material occurs are small in number, and the oxide film is not sufficiently broken or divided, so that it is difficult to obtain a stable joined state. In the present invention, by defining the area ratio of Si particles having an equivalent circle diameter of 1.75 μm or more, portions where exudation of the brazing material occurs are sufficiently secured.

When the area ratio (surface area ratio of Si particles in the brazing material) to the surface area (the overall surface area of the brazing material) is less than the lower limit, joining starting points in joining surfaces are too small in number, and a sufficient joined state cannot be obtained. On the other hand, when the area ratio exceeds the upper limit, material side brazing erosion becomes significant in the coarse Si particle portions, which causes brazing defects. Therefore, the area ratio of the Si particles is set to be in the above range.

Regarding the area ratio of the Si particles, the size and area ratio of the Si particles can be controlled by the solidification rate during the casting, the temperature and time of the homogenization treatment, the maximum reduction rate during the hot rolling, and the like.

Atomic Composition Ratio between Mg and Bi (Mg/Bi): 1.5 or More Satisfying the above atomic composition ratio suppresses the generation of solely Bi in the brazing material and improves the brazability. Therefore, the above atomic composition ratio is obtained as desired. When the atomic composition ratio is less than 1.5, solely Bi is easily generated, and the brazability is reduced.

For the same reason, it is desirable that the atomic composition ratio is 4.0 or more.

The element composition ratio between Mg and Bi is calculated by the method described below.

For example, in a case where the composition (content) of Mg in the brazing material is 1.5 wt % and the composition (content) of Bi is 0.3 wt %, the value of wt % is divided by the atomic weight of the corresponding element and converted into a molar content.

Mg: 1.50/24.3=0.0617=A
Bi: 0.30/209=0.00144=B

Then, the element composition ratio is calculated by dividing one of the values converted into the molar contents by the other.

Element composition ratio Mg/Bi=A/B=0.0617/0.00144=42.8

Core Material (Core Material Layer)

The composition of the core material in the present invention is not limited to a specific one, but the following components are preferably shown.

Si: 0.05% to 1.2%

Si has an effect of improving the material strength by being dissolved as a solid solution and also improving the material strength by precipitating as $Mg_2Si$ or an Al—Mn—Si compound. However, when the Si content is too small, the effect becomes insufficient. On the other hand, when the Si content is excessive, the solidus temperature of the core material decreases and the core material melts during brazing. For these reasons, in a case where Si is contained, the Si content is set to be in the above range. For the same reason, it is desirable that the Si content is set to 0.1% at the lower limit and 1.0% at the upper limit. Even in a case where Si is not positively contained, Si may be contained as an inevitable impurity, for example, in 0.05% or less.

Mg: 0.01% to 2.0%

Mg improves the material strength by precipitating as a compound with Si or the like. Some of Mg diffuses into the brazing material and reduces and decomposes the oxide film ($Al_2O_3$). However, when the Mg content is too small, the effect is insufficient. On the other hand, when Mg is excessively contained, not only be the effect saturated, but also the material becomes hard and brittle, making it difficult to manufacture the material. For these reasons, in a case where Mg is contained, the Mg content is set to be in the above range. For the same reason, it is desirable that the Mg content is set to 0.05% at the lower limit and 1.0% at the upper limit. Even in a case where Mg is not positively contained, Mg may be contained as an inevitable impurity, for example, in 0.01% or less.

Mn: 0.1% to 2.5%

Mn precipitates as an intermetallic compound and improves the material strength. Furthermore, Mg increases the potential of the material by being dissolved as a solid solution and improves corrosion resistance. However, when the Mn content is too small, the effect is insufficient. On the other hand, when Mn is excessively contained, the material becomes hard, and material rollability decreases. For these reasons, in a case where Mn is contained, the Mn content is set to be in the above range. For the same reason, it is desirable that the Mn content is set to 0.3% at the lower limit and 1.8% at the upper limit. Even in a case where Mn is not positively contained. Mn may be contained as an inevitable impurity, for example, in 0.1% or less.

Cu: 0.01% to 2.5%

Cu is dissolved as a solid solution and improves the material strength. However, when the Cu content is excessively small, the effect is insufficient. On the other hand, when Cu is excessively contained, the solidus temperature of the core material decreases and the core material melts during brazing. For these reasons, in a case where Cu is contained, the Cu content is set to be in the above range. For the same reason, it is desirable that the Cu content is set to 0.02% at the lower limit and 1.2% at the upper limit. Even in a case where Cu is not positively contained, Cu may be contained as an inevitable impurity, for example, in 0.01% or less.

Fe: 0.05% to 1.5%

Fe precipitates as an intermetallic compound and improves the material strength. Furthermore, Fe promotes recrystallization during brazing and suppresses brazing erosion. However, when the Fe content is less than the lower limit, the effect is insufficient. On the other hand, when the Fe content is excessive, a corrosion ratio after brazing becomes faster. For these reasons, in a case where Fe is contained, the Fe content is set to be in the above range. For the same reason, it is desirable that the Fe content is set to 0.1% at the lower limit and 0.6% at the upper limit. Even in a case where Fe is not positively contained. Fe may be contained as an inevitable impurity, for example, in 0.05% or less.

Zr: 0.01% to 0.3%

Zr forms a fine intermetallic compound and improves the material strength. However, when the Ti content is less than the lower limit, the effect is insufficient. On the other hand, when the Ti content is excessive, the material becomes hard and the workability deteriorates. For these reasons, in a case where Zr is contained, the Zr content is set to be in the above range. For the same reason, it is desirable that the Zr content is set to 0.05% at the lower limit and 0.2% at the upper limit.

Even in a case where Zr is not positively contained, Zr may be contained as an inevitable impurity, for example, in 0.01% or less.

Ti: 0.01% to 0.3%

Ti forms a fine intermetallic compound and improves the material strength. However, when the Ti content is less than the lower limit, the effect is insufficient. On the other hand, when the Ti content is excessive, the material becomes hard and the workability deteriorates. For these reasons, in a case where Ti is contained, the Ti content is set to be in the above range. For the same reason, it is desirable that the Ti content is set to 0.05% at the lower limit and 0.2% at the upper limit. Even in a case where Ti is not positively contained, Ti may be contained as an inevitable impurity, for example, in 0.01% or less.

Cr: 0.01% to 0.5%

Cr forms a fine intermetallic compound and improves material strength. However, when the Ti content is less than the lower limit, the effect is insufficient. On the other hand, when the Ti content is excessive, the material becomes hard and the workability deteriorates. For these reasons, in a case where Cr is contained, the Cr content is set to be in the above range. For the same reason, it is desirable that the Cr content is set to 0.05% at the lower limit and 0.3% at the upper limit. Even in a case where Cr is not positively contained, Cr may be contained as an inevitable impurity, for example, in 0.01% or less.

Bi: 0.005% to 1.5%

Bi reduces the surface tension of the molten braze by partially diffusing into the brazing material layer. Bi also suppresses the growth of the dense oxide film on the material surface. However, when the Bi content is less than the lower limit, the effect is insufficient. On the other hand, when the Bi content is excessive, the effect is saturated, and Bi oxides are easily generated on the material surface, thereby impeding joining. For these reasons, in a case where Bi is contained, the Bi content is set to be in the above range. For the same reason, it is desirable that the Bi content is set to 0.05% at the lower limit and 0.5% at the upper limit. Even in a case where Bi is not positively contained, Bi may be contained as an inevitable impurity, for example, in 0.005% or less.

Zn: 0.1% to 9.0%

Zn exhibits a sacrificial anticorrosive effect by making the pitting potential of the material lower than that of other members. However, when the Zn content is less than the lower limit, the effect is insufficient. On the other hand, when the Zn content is excessive, the effect is saturated. For these reasons, in a case where Zn is contained, the Zn content is set to be in the above range. For the same reason, it is desirable that the Zn content is set to 0.5% at the lower limit and 7.0% at the upper limit. Even in a case where Zn is not positively contained. Zn may be contained as an inevitable impurity, for example, in 0.1% or less.

Sacrificial Material (Sacrificial Material Layer)

In the present invention, an aluminum brazing sheet in which the core material is clad with the sacrificial material can be provided. The composition of the sacrificial material in the present invention is not limited to a specific one, but the following components are preferably shown.

Zn: 0.1% to 9.0%

Zn is added to exhibit a sacrificial anticorrosive effect by making the natural potential of the material lower than that of other members and improve the pitting corrosion resistance of a clad material. When the Zn content is less than the lower limit, the effect is insufficient. When the Zn content exceeds the upper limit, the potential becomes too low, the corrosion consumption rate of the sacrificial material increases, and the pitting corrosion resistance of the clad material is reduced by the loss of the sacrificial material at an early stage. For the same reason, it is desirable that the lower limit thereof is set to 1.0% and the upper limit thereof is set to 8.0%.

Si: 0.05% to 1.2%

Si improves the pitting corrosion resistance of the clad material by precipitating as an intermetallic compound such as Al—Mn—Si and Al—Mn—Si—Fe and dispersing starting points of corrosion, so that Si is added as desired. When the Si content is less than the lower limit, the effect is insufficient. When the Si content exceeds the upper limit, the corrosion ratio increases, and the pitting corrosion resistance of the clad material is reduced by the loss of the sacrificial material at an early stage. For the same reason, it is desirable that the lower limit thereof is set to 0.3% and the upper limit thereof is set to 1.0%.

Mg: 0.01% to 2.0%

Mg improves the corrosion resistance by strengthening the oxide film, so that Mg is added as desired. When the Mg content is less than the lower limit, the effect is insufficient. When the Mg content exceeds the upper limit, the material becomes too hard and rolling manufacturability is lowered. For the same reason, it is desirable that the lower limit thereof is set to 0.05% and the upper limit thereof is set to 1.5%.

Mn: 0.1% to 2.5%

Mn improves the pitting corrosion resistance of the clad material by precipitating as an intermetallic compound such as Al—Mn, Al—Mn—Si, Al—Mn—Fe, and Al—Mn—Si—Fe and dispersing starting points of corrosion, so that Mn is added as desired. When the Mn content is less than the lower limit, the effect is insufficient. When the Mn content exceeds the upper limit, the corrosion ratio increases, and the pitting corrosion resistance of the clad material is reduced by the loss of the sacrificial material at an early stage. For the same reason, it is desirable that the lower limit thereof is set to 0.4% and the upper limit thereof is set to 1.8%.

Fe: 0.05% to 1.5%

Fe improves the pitting corrosion resistance of the clad material by precipitating as an intermetallic compound such as Al—Mn—Fe and Al—Mn—Si—Fe and dispersing starting points of corrosion, so that Fe is added as desired. When the Fe content is less than the lower limit, the effect is insufficient. When the Fe content exceeds the upper limit, the corrosion ratio increases, and the pitting corrosion resistance of the clad material is reduced by the loss of the sacrificial material at an early stage. For the same reason, it is desirable that the lower limit thereof is set to 0.1% and the upper limit thereof is set to 0.7%.

Zr: 0.01% to 0.3%

Zr improves the pitting corrosion resistance of the clad material by precipitating as an Al—Zr-based intermetallic compound and dispersing starting points of corrosion, or by forming dark and light portions of solid solution Zr and making the form of corrosion into a layered form, so that Zr is added as desired. When the Zr content is less than the lower limit, the effect is insufficient. When the Zr content exceeds the upper limit, a huge intermetallic compound is formed during the casting and the rollability decreases. For the same reason, it is desirable that the lower limit thereof is set to 0.05% and the upper limit thereof is set to 0.25%.

Ti: 0.01% to 0.3%

Ti improves the pitting corrosion resistance of the clad material by precipitating as an Al—Ti-based intermetallic compound and dispersing starting points of corrosion, or by forming dark and light portions of solid solution Ti and making the form of corrosion into a layered form, so that Ti is added as desired. When the Ti content is less than the lower limit, the effect is insufficient. When the Ti content exceeds the upper limit, a huge intermetallic compound is formed during the casting and the rollability decreases. For the same reason, it is desirable that the lower limit thereof is set to 0.05% and the upper limit thereof is set to 0.25%.
Cr: 0.01% to 0.5%

Cr improves the pitting corrosion resistance of the clad material by precipitating as an Al—Cr-based intermetallic compound and dispersing starting points of corrosion, or by forming dark and light portions of solid solution Cr and making the form of corrosion into a layered form, so that Cr is added as desired. When the Cr content is less than the lower limit, the effect is insufficient. When the Cr content exceeds the upper limit, a huge intermetallic compound is formed during the casting and the rollability decreases. For the same reason, it is desirable that the lower limit thereof is set to 0.1% and the upper limit thereof is set to 0.4%.
Bi: 0.005% to 1.5%

Bi reduces the surface tension of the molten braze by diffusing into the molten braze when the molten braze comes into contact with the surface of the sacrificial material, and suppresses the growth of a dense oxide film on the material surface, so that Bi is added as desired. However, when the Bi content is less than the lower limit, the effect is insufficient. On the other hand, when the Bi content is excessive, the effect is saturated, and Bi oxides are easily generated on the material surface, thereby impeding joining. For these reasons, the Bi content is set to be in the above range. For the same reason, it is desirable that the Bi content is set to 0.05% at the lower limit and 0.5% at the upper limit. However, even in a case where Bi is not positively added, Bi may be contained as an inevitable impurity, for example, in 0.005% or less.

Advantageous Effects of Invention

According to the present invention, it is possible to perform good and stable braze joining without a flux in a non-oxidizing atmosphere.

DESCRIPTION OF EMBODIMENTS

Hereinafter, an embodiment of the present invention will be described. An aluminum material used for a brazing sheet of the present invention can be manufactured, for example, by the following method. As an aluminum alloy for a brazing material, an Al—Si—Mg—Bi-based brazing material having a composition including, by mass %, 0.01% to 2.0% of Mg, 1.5% to 14.0% of Si, 0.005% to 1.5% of Bi, 0.1% to 9.0% of Zn by mass % as desired, and a remainder consisting of Al and inevitable impurities is prepared. The brazing material may contain, as other elements, 2.0% or less of In, Sn, and Mn. 1.0% or less of Fe, Ni, Ce, and Se, 0.3% or less of Be, Na, Sb, Ti, Zr, P, S, K, and Rb, and the like. Moreover, the brazing material is located at the outermost surface layer, and may have a brazing material with a different composition at the inner layer thereof. That is, the brazing material layer may have a plurality of layers. In a case of having the brazing material of the inner layer, the composition of the brazing material of the inner layer is not particularly limited, and examples thereof include an Al—Si-based brazing material and an Al—Si—Zn-based brazing material.

As an aluminum alloy for a core material, an aluminum alloy is adjusted to have a composition including, by mass %, one or two or more of Si: 0.05% to 1.2%, Mg: 0.01% to 2.0%, Mn: 0.1% to 2.5%, Cu: 0.01% to 2.5%, Fe: 0.05% to 1.5%. Zr: 0.01% to 0.3%, Ti: 0.01% to 0.3%, Cr: 0.01% to 0.5%, Bi: 0.005% to 1.5%, and Zn: 0.1% to 9.0% and including a remainder consisting of Al and inevitable impurities.

In a case of using a sacrificial material, as an aluminum alloy for the sacrificial material, for example, an aluminum alloy is adjusted to have a composition including, by mass %, Zn: 0.1% to 9.0%, further including one or two or more of Si: 0.05% to 1.2%, Mg: 0.01% to 2.0%, Mn: 0.1% to 2.5%, Fe: 0.05% to 1.5%, Zr: 0.01% to 0.3%. Ti: 0.01% to 0.3%, Cr: 0.01% to 0.5%, Bi: 0.005% to 1.5%, and including a remainder consisting of Al and inevitable impurities.

An aluminum alloy is melted by preparing the composition of the present invention. The melting can be performed by a semi-continuous casting method. In the present invention, in order to disperse a fine Mg—Bi compound at the time before brazing, Mg and Bi are dissolved in an ingot as a solid solution to be supersaturated by performing rapid cooling from a high molten metal temperature during the casting of the brazing material. Specifically, the solid solubility of Mg and Bi can be increased by setting the molten metal temperature to 700° C. or higher. The obtained aluminum alloy ingot is subjected to a homogenization treatment under predetermined conditions. When the homogenization treatment temperature is low, a coarse Mg—Bi compound is precipitated and it is difficult to obtain the distributed state of the Mg—Bi compound of the present invention at the time before the brazing. Therefore, it is desirable to perform the treatment at a treatment temperature of 400° C. or higher for 1 to 10 hours.

Furthermore, in the present invention, in the number of Si particles contained in the brazing material and having an equivalent circle diameter of 0.8 μm or more, the number of Si particles having a diameter of 1.75 μm or more is desirably 25% or more. In order to obtain this material, the size and area ratio of the Si particles can be controlled by a solidification rate during the casting, the temperature and time of the homogenization treatment, a maximum reduction rate during hot rolling, and the like. For example, when the brazing material is cast, if the cooling rate is lower than ° C./sec, the size of Si particles generated by solidification cooling becomes coarse. However, the Si particles are crushed in the subsequent rolling step, so that the above conditions can be satisfied. However, even in a case where this cooling rate becomes higher than 10° C./sec, when a heat treatment is performed, for example, under the condition of 500° C. or higher for several hours as the homogenization treatment after the casting, coarsening of the Si particles is achieved, and it is possible to obtain the Si particle size of the conditions of the present invention after the rolling as described above. Moreover, as for the reduction rate during the hot rolling, the larger the reduction rate of one rolling is, the finer the Si particles are crushed. By controlling these conditions in combination, the distribution of the Si particles (size, ratio of coarse particles, and area ratio) can be changed.

Next, the brazing material is assembled with the core material and the like and is subjected to hot clad rolling. At this time, in the present invention, the Mg—Bi compound is adjusted to a predetermined size and number density by controlling a rolling time at a predetermined temperature during the hot rolling, an equivalent strain from the start to the end of the hot rolling, a hot rolling finish temperature, and a cooling rate after the hot rolling.

First, by satisfying the rolling time in a predetermined temperature range during the hot rolling, precipitation of the Mg—Bi compound having a predetermined size defined in the present invention is promoted in an environment where dynamic strain is applied. Specifically, the precipitation of the fine Mg—Bi compound is promoted by setting the rolling time during which the material temperature during the hot rolling is between 400° C. and 500° C. to 10 minutes or more.

Furthermore, by controlling the equivalent strain from the start to the end of the hot rolling, a coarse Mg—Bi crystallized product generated during the casting can be crushed and refined. Specifically, the Mg—Bi crystallized product is sufficiently refined by adjusting a slab thickness and a finish thickness so that the equivalent strain ε represented by Formula (1) satisfies ε>5.0.

$$\varepsilon = (2/\sqrt{3})\ln(t_0/t) \quad \text{Formula (1)}$$

$t_0$: Hot rolling start thickness (slab thickness)
t: Hot rolling finish thickness Furthermore, when the hot rolling finish temperature is high and a state without dynamic strain is maintained, or when the cooling rate after the hot rolling is slow, a coarser Mg—Bi compound than desired by the present invention is precipitated at grain boundaries and the like. Therefore, by securing a cooling rate of a certain level or more by reducing the hot rolling finish temperature to a predetermined temperature, the precipitation of a coarse Mg—Bi compound is suppressed. Specifically, the precipitation of a coarse Mg—Bi compound is suppressed by setting the hot rolling finish temperature to 250° C. to 350° C. and controlling the cooling rate from the finish temperature to 200° C. to be faster than −20° C./hr. Thereafter, the brazing sheet of the present invention is obtained through cold rolling or the like. In the cold rolling, for example, cold rolling can be performed with a total reduction rate of 75% or more, process annealing can be performed at a temperature of 300° C. to 400° C., and then final rolling with a reduction rate of 40% can be performed. In cold rolling, the Mg—Bi compound is crushed and refined to some extent. However, since the size and number density thereof do not deviate from those targeted by the present invention, the conditions are not particularly limited. The process annealing may not be performed.

Furthermore, in the present invention, Bi particles contained in the Al—Si—Mg—Bi-based brazing material and having an equivalent circle diameter of 5.0 μm or more are desirably less than 5 in number per 10,000-μm² visual field when observed in a surface layer plane direction before brazing. In order to obtain this material, adjustment can be achieved by appropriately combining the mixing ratio of Mg and Bi of the alloy, the molten metal temperature and the cooling rate during the casting, and the homogenization treatment conditions. For example, the generation of the Mg—Bi compound can be promoted by setting the mixing ratio of Mg and Bi blended in the brazing material to 1.5 or more in terms of atomic composition ratio. In the casting, the generation of the Mg—Bi compound can be promoted by reducing the cooling rate to less than 10° C./sec during the casting. Furthermore, in the homogenization treatment, the generation of the Mg—Bi compound in the ingot can be promoted by performing the homogenization treatment at a temperature as high 400° C. or higher.

Figure 1:
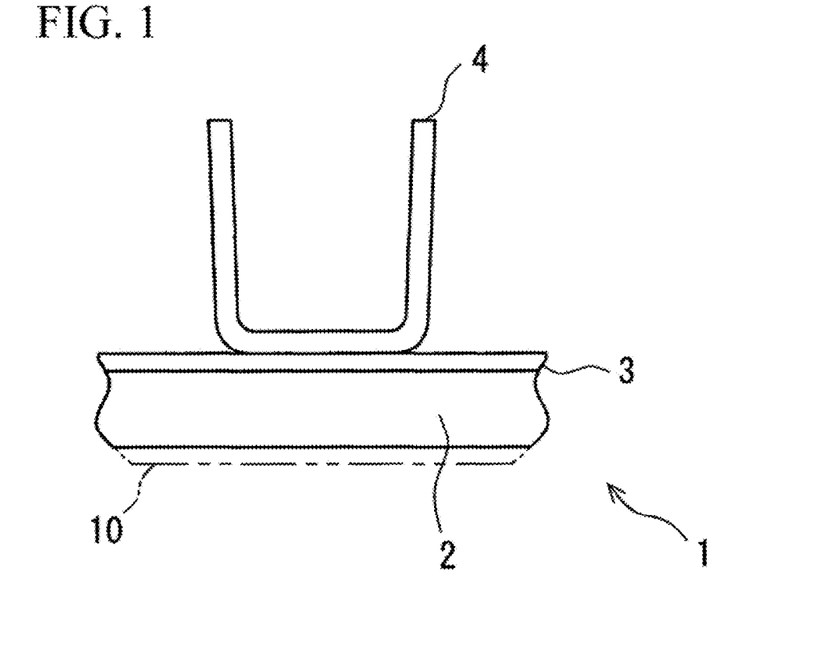
FIG. 1 is a view illustrating a brazing sheet for flux-free brazing according to an embodiment of the present invention.

Hot rolling and cold rolling are performed to obtain a clad material in which the brazing material is superimposed on and joined to one or both surfaces of the core material. Through the above process, as illustrated in FIG. 1, an aluminum brazing sheet 1 for a heat exchanger in which an aluminum alloy brazing material 3 is clad on one surface of an aluminum alloy core material 2 is obtained. In the figure, the brazing material is clad on one surface of the core material. However, the brazing material may be clad on both surfaces of the core material. Furthermore, a sacrificial material 10 or the like may be clad on the other surface of the core material. As a brazing target member 4, for example, by mass %, an aluminum alloy having a composition including Mg: 0.1% to 0.8%, Si: 0.1% to 1.2%, and a remainder consisting of Al and inevitable impurities is prepared and processed into a suitable shape. In the present invention, the composition of the brazing target member is not particularly limited.

In a case where a fin material for a heat exchanger is obtained by the cold rolling or the like, thereafter, corrugating or the like is performed as necessary. The corrugating process can be performed by passing between two rotating molds, enables satisfactory processing, and exhibits excellent formability.

The fin material obtained in the above process is subjected to brazing as an assembly combined with other constituent members (tube, header, and the like) as the constituent members of the heat exchanger. The assembly is disposed in a heating furnace having a non-oxidizing atmosphere under a normal pressure. A non-oxidizing gas can be constituted using an inert gas such as nitrogen gas, argon, a reducing gas such as hydrogen or ammonia, or a mixed gas thereof. Although the pressure of the atmosphere in a brazing furnace is basically the normal pressure, for example, in order to improve a gas replacement efficiency inside a product, a medium to low vacuum of about 100 kPa to 0.1 Pa in a temperature range before melting the brazing material may be employed, or a positive pressure of 5 to 100 Pa from the atmospheric pressure may be employed in order to suppress the infiltration of outside air (atmosphere) into the furnace. These pressure ranges are included in a range of "without depressurization" in the present invention.

The heating furnace does not need to have a sealed space, and may be a tunnel type having a carry-in port and a carry-out port for the brazing material. Even in such a heating furnace, non-oxidizing properties are maintained by continuously blowing the inert gas into the furnace. The non-oxidizing atmosphere desirably has an oxygen concentration of 100 ppm or less by volume ratio.

In the above atmosphere, for example, heating is performed at a temperature rising rate of 10 to 200° C./min, and braze joining is performed under heat treatment conditions in which an attainment temperature of the assembly is 559° C. to 630° C. Under the brazing conditions, the brazing time is shortened as the temperature rising rate is increased, so that the growth of an oxide film on a material surface is suppressed and the brazability is improved. Brazing is possible when the attainment temperature is equal to or higher than at least the solidus temperature of the brazing material. However, the brazing material which flows increases in amount as the temperature approaches the liquidus temperature, and a good joined state is easily obtained at a joint having an open portion. However, when the temperature is too high, brazing erosion tends to proceed, and the structural dimensional accuracy of the assembly after brazing decreases, which is not preferable.

Figure 2:
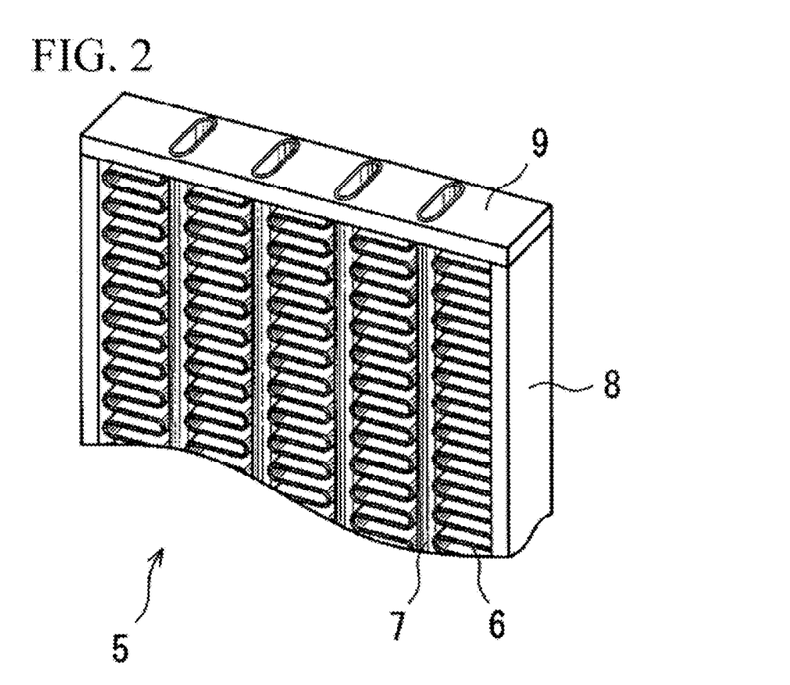
FIG. 2 is a perspective view illustrating an aluminum heat exchanger for a vehicle according to the embodiment of the present invention.

FIG. 2 illustrates an aluminum heat exchanger 5 in which fins 6 are formed using the aluminum brazing sheet 1 and a tube 7 made of an aluminum alloy is used as a brazing target material. The fin 6 and the tube 7 are assembled with a reinforcing member 8 and a header plate 9 to obtain the aluminum heat exchanger 5 for a vehicle or the like by flux-free brazing.

EXAMPLES

Various brazing sheets having the compositions shown in Tables 1 to 6 (core material, brazing material, sacrificial material; remainder consisting of Al and inevitable impurities) were produced into hot rolled sheets under the casting conditions and hot rolling conditions shown in Table 7. Specimens whose sacrificial material components are indicated by "-" do not use sacrificial materials. Thereafter, cold rolled sheets having a thickness of 0.30 mm and having an H14 equivalent grade were produced by cold rolling including process annealing. The clad ratio of each layer was 10% for the brazing material and 15% for the sacrificial material. Moreover, as the brazing target member, a corrugated fin of an aluminum bare material (0.06 mm thickness) of A3003 alloy and H14 was prepared.

A tube having a width of 25 mm was produced using the aluminum brazing sheet, and the tube and the corrugated fin were combined so that the tube brazing material and the corrugated fin are in contact with each other, thereby forming a core having a 15-stage tube and a length of 300 mm as a brazing evaluation model. The core was heated to 600° C. and held for 5 minutes in a brazing furnace in a nitrogen atmosphere (oxygen content 20 ppm), and the brazed state was evaluated. The evaluation results are shown in Tables 8 and 9.

Brazability

A joint ratio was obtained by the following formula, and superiority and inferiority between the samples were evaluated.

Fin joint ratio=(total brazing length of fin and tube/
total contact length of fin and tube)×100

The determination was made according to the following criteria, and the results are shown in Tables 8 and 9.
Fin joint ratio after brazing A: 98% or more
B: 90% or more and less than 98%
C: 80% or more and less than 90%
D: less than 80%

Joint Fillet Length

Figure 3:
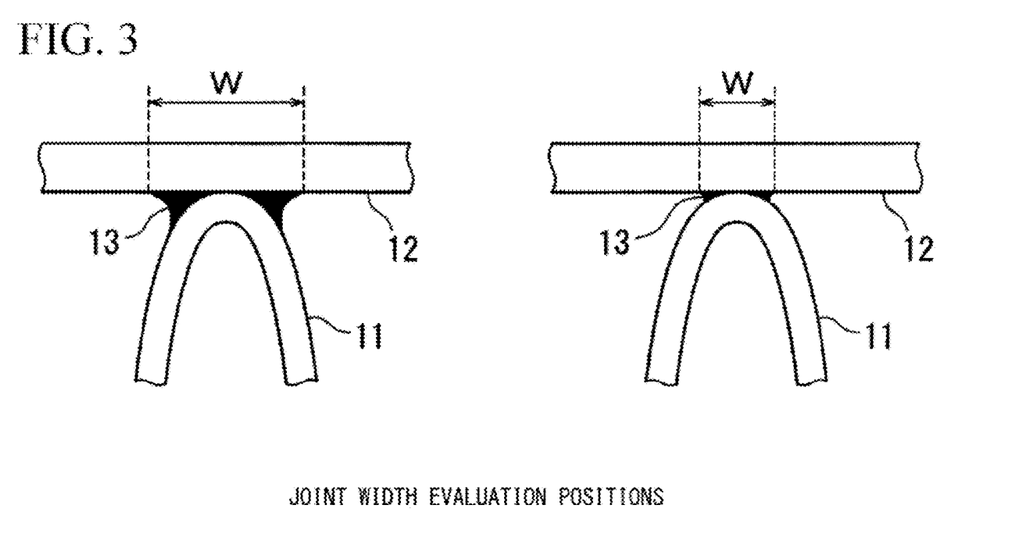
FIG. 3 is a view illustrating a brazing evaluation model in an example of the present invention.

A portion of the brazed core was cut out, embedded in a resin, and mirror-polished, and the fillet length at a joint was measured using an optical microscope. As a measurement method, the width W of a joint 13 illustrated in FIG. 3 was measured at 20 points for each sample, and superiority or inferiority was evaluated by the average value thereof. The determination was based on the following criteria and shown in Tables 8 and 9.
A: 1.0 mm or more
B: 0.8 mm or more and less than 1.0 mm
C: 0.6 mm or more and less than 0.8 mm
D: less than 0.6 mm Strength after Brazing The brazing sheet was placed in a furnace in a drop form, and a brazing equivalent heat treatment was performed under the brazing conditions. Thereafter, the sample was cut out, a tensile test was conducted at room temperature by a normal method based on JIS, and a tensile strength was evaluated. The results are shown in Tables 8 and 9.

Corrosion Resistance

A brazing sheet having a sacrificial material was placed in a furnace in a drop form, and subjected to a brazing equivalent heat treatment under the brazing conditions. Thereafter, the sample was cut into a size of 30 mm×80 mm, masked except for the sacrificial material surface, and then subjected to Sea Water Acetic Acid Test (SWAAT, ASTM G85-A3) for 40 days. Corrosion products were removed from the sample after the corrosion test with chromic acid phosphate, and the corrosion depth was measured by observing the cross section of a maximum corrosion portion. The determination was based on the following criteria and shown in Tables 8 and 9.
A: In the sacrificial material layer
B: Within the half of the sheet thickness
C: Not penetrated
D: Penetrated While all of the examples showed good brazability, the comparative examples did not obtain sufficient joining.

Ratio and Area Ratio of Si Particles Having Diameter of 1.75 μm or More on Surface of Brazing Material Layer Regarding the produced aluminum clad material, the outermost surface of the brazing material was polished with 0.1-μm abrasive grains, and fully automatic particle analysis using an electron beam microanalyzer (EPMA) was performed on an observation visual field of 10,000 μm² (corresponding to 100-μm square) for each sample from the surface direction. In the measurement, the ratio (%) of the number of Si particles having an equivalent circle diameter of 1.75 μm or more to the number of Si particles having an equivalent circle diameter of 0.8 μm or more was calculated, and furthermore, the area ratio (to the surface area) of the particles having an equivalent circle diameter of 1.75 μm or more was calculated. The measurement results are shown in Tables 1 and 2.

TABLE 1

| | Specimen No. | Elements added to brazing material [wt %] | | | | Co (ppm) | Manu- facturing method | Mg—Bi compound of less than 5 μm [/10000 μm²] | Mg—Bi compound of 5 μm or more [/10000 μm²] | Bi particles [/10000 μm²] | Ratio of Si particles of 1.75 μm or more [%] | Area ratio of Si particles of 1.75 μm or more [%] | Atomic composition ratio Mg/Bi of brazing material |
|---|---|---|---|---|---|---|---|---|---|---|---|---|---|
| | | Mg | Si | Bi | Zn | | | | | | | | |
| Example | 1 | 0.01 | 7.5 | 0.3 | — | 8 | E | 14 | 1 | 4 | 35 | 0.4 | 0.3 |
| | 2 | 0.1 | 7.5 | 0.3 | — | 8 | D | 26 | 0 | 3 | 44 | 0.5 | 2.9 |
| | 3 | 1.5 | 7.5 | 0.3 | — | 8 | B | 46 | 0 | 2 | 35 | 0.5 | 43.0 |

TABLE 1-continued

| | Elements added to brazing material [wt %] | | | | | Manu-facturing method | Mg—Bi compound of less than 5 μm [/10000 μm²] | Mg—Bi compound of 5 μm or more [/10000 μm²] | Bi particles [/10000 μm²] | Ratio of Si particles of 1.75 μm or more [%] | Area ratio of Si particles of 1.75 μm or more [%] | Atomic composition ratio Mg/Bi of brazing material |
|---|---|---|---|---|---|---|---|---|---|---|---|---|
| Specimen No. | Mg | Si | Bi | Zn | Co (ppm) | | | | | | | |
| 4 | 2.0 | 7.5 | 0.3 | — | 8 | H | 47 | 0 | 2 | 33 | 0.6 | 57.3 |
| 5 | 0.5 | 1.5 | 0.3 | — | 8 | F | 54 | 0 | 3 | 35 | 0.1 | 14.3 |
| 6 | 0.5 | 3.0 | 0.3 | 1.0 | 8 | A | 45 | 0 | 3 | 35 | 0.2 | 14.3 |
| 7 | 0.5 | 12.0 | 0.3 | 2.0 | 8 | I | 56 | 0 | 2 | 38 | 1.1 | 14.3 |
| 8 | 0.5 | 14.0 | 0.3 | — | 8 | B | 39 | 0 | 3 | 35 | 1.5 | 14.3 |
| 9 | 0.5 | 7.5 | 0.005 | — | 8 | J | 18 | 0 | 1 | 39 | 0.5 | 859.8 |
| 10 | 0.5 | 7.5 | 0.05 | — | 8 | I | 28 | 0 | 2 | 40 | 0.5 | 86.0 |
| 11 | 0.5 | 7.5 | 0.5 | — | 8 | C | 62 | 0 | 3 | 35 | 0.6 | 8.6 |
| 12 | 0.5 | 7.5 | 1.5 | — | 8 | B | 67 | 0 | 4 | 35 | 0.6 | 2.9 |
| 13 | 0.5 | 7.5 | 0.3 | 0.1 | 8 | A | 44 | 0 | 3 | 35 | 0.5 | 14.3 |
| 14 | 0.5 | 7.5 | 0.3 | 0.5 | 8 | D | 46 | 0 | 3 | 44 | 0.5 | 14.3 |
| 15 | 0.5 | 7.5 | 0.3 | 7.0 | 8 | G | 53 | 0 | 3 | 35 | 0.5 | 14.3 |
| 16 | 0.5 | 7.5 | 0.3 | 9.0 | 8 | B | 34 | 0 | 3 | 35 | 0.5 | 14.3 |
| 17 | 0.5 | 7.5 | 0.3 | — | 90 | I | 56 | 0 | 2 | 40 | 0.5 | 14.3 |
| 18 | 0.5 | 7.5 | 0.3 | 3.0 | 8 | H | 44 | 0 | 3 | 35 | 0.5 | 14.3 |
| 19 | 0.5 | 7.5 | 0.3 | 3.0 | 50 | C | 38 | 0 | 3 | 37 | 0.5 | 14.3 |
| 20 | 0.5 | 7.5 | 0.3 | — | 8 | J | 58 | 0 | 2 | 40 | 0.5 | 14.3 |
| 21 | 0.5 | 7.5 | 0.3 | 3.0 | 8 | E | 50 | 0 | 3 | 35 | 0.5 | 14.3 |
| 22 | 0.05 | 10.5 | 0.5 | 1.0 | 8 | E | 31 | 0 | 3 | 34 | 0.6 | 0.9 |
| 23 | 0.3 | 10.5 | 0.7 | 3.0 | 8 | B | 54 | 0 | 3 | 35 | 0.7 | 3.7 |
| 24 | 0.3 | 10.5 | 0.7 | 3.0 | 8 | C | 57 | 0 | 3 | 40 | 0.7 | 3.7 |
| 25 | 0.7 | 10.5 | 0.2 | — | 8 | H | 43 | 0 | 3 | 35 | 0.8 | 30.1 |
| 26 | 0.7 | 10.5 | 0.2 | — | 120 | D | 45 | 0 | 2 | 43 | 0.8 | 30.1 |
| 27 | 0.2 | 10.5 | 0.2 | — | 8 | A | 25 | 0 | 3 | 35 | 0.6 | 8.6 |
| 28 | 0.7 | 10.5 | 0.2 | — | 8 | B | 34 | 0 | 2 | 35 | 0.8 | 30.1 |
| 29 | 0.7 | 10.5 | 0.2 | — | 8 | D | 44 | 0 | 3 | 44 | 0.8 | 30.1 |
| 30 | 0.2 | 10.5 | 0.2 | — | 8 | A | 26 | 0 | 3 | 35 | 0.6 | 8.6 |
| 31 | 0.01 | 7.5 | 0.3 | — | 8 | E | 14 | 1 | 4 | 35 | 0.4 | 0.3 |
| 32 | 0.1 | 7.5 | 0.3 | — | 8 | D | 26 | 0 | 3 | 44 | 0.5 | 2.9 |
| 33 | 1.5 | 7.5 | 0.3 | — | 8 | B | 46 | 0 | 2 | 35 | 0.5 | 43.0 |
| 34 | 2.0 | 7.5 | 0.3 | — | 8 | H | 47 | 0 | 2 | 33 | 0.6 | 57.3 |
| 35 | 0.5 | 1.5 | 0.3 | — | 8 | B | 54 | 0 | 3 | 35 | 0.1 | 14.3 |
| 36 | 0.5 | 3.0 | 0.3 | 1.0 | 8 | A | 45 | 0 | 3 | 35 | 0.2 | 14.3 |
| 37 | 0.5 | 12.0 | 0.3 | 2.0 | 8 | I | 56 | 0 | 2 | 38 | 1.1 | 14.3 |
| 38 | 0.5 | 14.0 | 0.3 | — | 8 | B | 39 | 0 | 3 | 35 | 1.5 | 14.3 |
| 39 | 0.5 | 7.5 | 0.005 | — | 8 | J | 18 | 0 | 1 | 39 | 0.5 | 859.8 |
| 40 | 0.5 | 7.5 | 0.05 | — | 8 | I | 28 | 0 | 2 | 40 | 0.5 | 86.0 |
| 41 | 0.5 | 7.5 | 0.5 | — | 8 | C | 62 | 0 | 1 | 35 | 0.6 | 8.6 |
| 42 | 0.5 | 7.5 | 1.5 | — | 8 | B | 67 | 0 | 4 | 35 | 0.6 | 2.9 |
| 43 | 0.5 | 7.5 | 0.3 | 0.1 | 8 | A | 44 | 0 | 3 | 35 | 0.5 | 14.3 |
| 44 | 0.5 | 7.5 | 0.3 | 0.5 | 8 | D | 46 | 0 | 3 | 44 | 0.5 | 14.3 |
| 45 | 0.5 | 7.5 | 0.3 | 2.0 | 8 | G | 53 | 0 | 3 | 35 | 0.5 | 14.3 |
| 46 | 0.5 | 7.5 | 0.3 | 9.0 | 8 | B | 34 | 0 | 3 | 35 | 0.5 | 14.3 |
| 47 | 0.5 | 7.5 | 0.3 | — | 90 | I | 56 | 0 | 2 | 40 | 0.5 | 14.3 |
| 48 | 0.5 | 7.5 | 0.3 | 3.0 | 8 | H | 44 | 0 | 3 | 35 | 0.5 | 14.3 |
| 49 | 0.5 | 7.5 | 0.3 | 3.0 | 50 | C | 38 | 0 | 3 | 37 | 0.5 | 14.3 |
| 50 | 0.5 | 7.5 | 0.3 | — | 8 | I | 58 | 0 | 2 | 40 | 0.5 | 14.3 |
| 51 | 0.5 | 7.5 | 0.3 | 1.0 | 8 | F | 50 | 0 | 3 | 35 | 0.5 | 14.3 |
| 52 | 0.05 | 10.5 | 0.5 | 1.0 | 8 | E | 31 | 0 | 3 | 34 | 0.6 | 0.9 |
| 53 | 0.3 | 10.5 | 0.7 | 3.0 | 8 | B | 54 | 0 | 3 | 35 | 0.7 | 3.7 |
| 54 | 0.3 | 10.5 | 0.7 | 3.0 | 8 | C | 57 | 0 | 3 | 40 | 0.7 | 3.7 |
| 55 | 0.7 | 10.5 | 0.2 | — | 8 | H | 43 | 0 | 3 | 35 | 0.8 | 30.3 |
| 56 | 0.7 | 10.5 | 0.2 | — | 120 | D | 45 | 0 | 2 | 43 | 0.8 | 30.3 |
| 57 | 0.2 | 10.5 | 0.2 | — | 8 | A | 25 | 0 | 3 | 35 | 0.6 | 8.6 |
| 58 | 0.7 | 10.5 | 0.2 | — | 8 | B | 34 | 0 | 2 | 35 | 0.8 | 30.3 |
| 59 | 0.7 | 10.5 | 0.2 | — | 8 | D | 44 | 0 | 3 | 44 | 0.8 | 30.1 |
| 60 | 0.2 | 10.5 | 0.2 | — | 8 | A | 26 | 0 | 3 | 35 | 0.6 | 8.6 |
| 81 | 0.5 | 1.5 | 0.3 | — | 8 | P | 50 | 0 | 2 | 28 | 0.08 | 14.3 |
| 82 | 0.5 | 1.5 | 0.3 | — | 8 | Q | 48 | 0 | 2 | 23 | 0.07 | 14.3 |
| 83 | 1.5 | 2.5 | 0.3 | — | 8 | R | 40 | 0 | 2 | 25 | 0.3 | 43.0 |
| 84 | 0.09 | 10.5 | 0.5 | 1 | 8 | E | 38 | 0 | 3 | 34 | 0.6 | 1.5 |
| 85 | 0.5 | 7.5 | 0.3 | — | 100 | I | 56 | 0 | 2 | 40 | 0.5 | 14.3 |

| Specimen No. | | Elements added to brazing material [wt %] | | | | Manu-facturing method | Mg—Bi compound of less than 5 μm [/10000 μm²] | Mg—Bi compound of 5 μm or more [/10000 μm²] | Bi particles [/10000 μm²] | Ratio of Si particles of 1.75 μm or more [%] | Area ratio of Si particles of 1.75 μm or more [%] | Atomic concentration ratio Mg/Bi of brazing material |
|---|---|---|---|---|---|---|---|---|---|---|---|---|---|
| | | Mg | Si | Bi | Zn | Ca (ppm) | | | | | | | |
| Comparative Example | 61 | 0.005 | 7.5 | 0.3 | — | 8 | B | 9 | 3 | 3 | 35 | 0.3 | 0.2 |
| | 62 | 2.2 | 7.5 | 0.3 | — | 8 | | Cannot be evaluated due to improper production | | | | | 63.1 |
| | 63 | 0.5 | 1.4 | 0.3 | 1.0 | 8 | P | 51 | 0 | 3 | 35 | 0.05 | 14.3 |
| | 64 | 0.5 | 15.0 | 0.3 | 1.0 | 8 | | Cannot be evaluated due to improper production | | | | | 14.3 |
| | 65 | 0.5 | 7.5 | 0.003 | — | 8 | C | 7 | 6 | 2 | 35 | 0.4 | 1433.0 |
| | 66 | 0.5 | 7.5 | 1.6 | — | 8 | | Cannot be evaluated due to improper production | | | | | 2.7 |
| | 67 | 0.3 | 7.5 | 0.1 | — | 8 | M | 8 | 5 | 2 | 25 | 0.7 | 25.8 |
| | 68 | 0.5 | 7.5 | 0.1 | — | 8 | L | 7 | 6 | 5 | 22 | 0.8 | 43.0 |
| | 69 | 0.2 | 10.5 | 0.1 | 2.0 | 8 | K | 9 | 3 | 2 | 26 | 0.6 | 17.2 |
| | 70 | 0.5 | 10.5 | 0.3 | 2.0 | 8 | O | 8 | 5 | 3 | 20 | 0.9 | 14.3 |
| | 71 | 0.2 | 10.5 | 0.005 | — | 50 | N | 9 | 5 | 4 | 18 | 1.0 | 343.9 |
| | 72 | 0.5 | 10.5 | 0.3 | 3.0 | 8 | L | 9 | 5 | 6 | 21 | 0.8 | 14.3 |
| Reference Example | 73 | 0.5 | 10.5 | 0.5 | 1.0 | 8 | C | 36 | 0 | 3 | 35 | 0.6 | 8.6 |
| | 74 | 0.5 | 10.5 | 0.2 | 1.0 | 8 | | Cannot be evaluated due to improper production | | | | | 21.5 |
| | 75 | 0.7 | 10.5 | 0.2 | — | 8 | | Cannot be evaluated due to improper production | | | | | 30.1 |
| | 76 | 0.7 | 10.5 | 0.2 | — | 8 | | Cannot be evaluated due to improper production | | | | | 30.1 |
| | 77 | 0.7 | 7.5 | 0.3 | — | 8 | | Cannot be evaluated due to improper production | | | | | 20.1 |
| | 78 | 0.7 | 7.5 | 0.3 | — | 8 | | Cannot be evaluated due to improper production | | | | | 20.1 |
| | 79 | 0.5 | 7.5 | 0.3 | — | 8 | | Cannot be evaluated due to improper production | | | | | 14.3 |
| | 80 | 0.5 | 7.5 | 0.1 | — | 8 | A | 28 | 0 | 3 | 33 | 0.4 | 43.0 |

TABLE 3

| Specimen No. | Core material composition [wt %] | | | | | | | | | |
|---|---|---|---|---|---|---|---|---|---|---|
| | Si | Mg | Mn | Cu | Fe | Zr | Ti | Cr | Bi | Zn |
| Example 1 | 0.6 | 0.5 | — | — | — | — | — | — | — | — |
| 2 | 0.6 | 0.5 | — | — | — | — | — | — | — | — |
| 3 | 0.6 | 0.5 | 0.5 | — | 0.3 | — | — | — | 0.005 | — |
| 4 | 0.6 | 0.5 | 0.5 | — | 0.3 | — | — | — | 0.01 | — |
| 5 | 0.6 | 0.5 | 0.5 | — | 0.3 | — | — | — | 0.01 | — |
| 6 | 0.6 | 0.5 | 0.5 | 0.02 | 0.2 | — | — | 0.02 | — | — |
| 7 | 0.6 | 0.5 | 0.3 | 0.05 | — | — | — | 0.02 | — | — |
| 8 | 0.6 | 0.5 | 0.1 | — | — | — | — | 0.2 | — | — |
| 9 | 0.6 | 0.5 | 1.5 | — | — | 0.1 | 0.2 | — | — | — |
| 10 | 0.6 | 0.5 | 1.0 | — | — | 0.1 | — | — | — | — |
| 11 | 0.6 | 0.5 | 0.5 | 0.5 | — | 0.1 | — | — | — | — |
| 12 | 0.6 | 0.5 | 0.5 | 0.5 | — | 0.1 | — | — | 0.05 | — |
| 13 | 0.6 | 0.5 | 0.5 | 0.3 | — | — | — | — | 0.05 | — |
| 14 | 0.6 | 0.5 | 0.5 | 0.3 | 0.3 | — | — | — | 0.3 | — |
| 15 | 0.6 | 0.5 | 0.5 | 1.0 | 0.05 | — | — | — | 0.3 | — |
| 16 | 0.6 | 0.5 | 0.5 | 1.0 | 0.3 | — | — | — | 0.5 | — |
| 17 | 0.6 | 0.5 | 0.5 | — | 0.3 | — | — | — | 0.5 | — |
| 18 | 0.05 | 0.5 | 0.5 | — | 0.3 | — | — | — | — | — |
| 19 | 0.1 | 0.5 | 0.5 | — | 0.3 | — | — | — | — | — |
| 20 | 1.0 | 0.5 | 0.5 | — | 0.3 | — | — | — | — | — |
| 21 | 1.2 | 0.5 | 0.5 | — | 0.3 | — | — | — | 0.5 | — |
| 22 | 0.6 | 0.01 | 0.5 | 0.2 | 0.5 | — | — | — | 0.5 | — |
| 23 | 0.6 | 0.05 | 0.5 | 0.2 | 0.5 | — | — | — | 0.3 | — |
| 24 | 0.6 | 1.0 | 0.5 | 0.2 | — | — | — | — | 0.2 | — |
| 25 | 0.6 | 2.0 | 0.5 | — | — | — | 0.1 | — | — | — |
| 26 | 0.6 | 0.5 | 0.5 | — | — | — | 0.1 | — | — | — |
| 27 | 0.6 | 0.5 | 0.5 | — | — | — | 0.1 | — | — | — |
| 28 | 0.6 | 0.5 | 0.5 | — | — | — | 0.1 | — | — | — |
| 29 | 0.6 | 1.0 | 0.5 | — | 0.3 | — | — | — | — | — |
| 30 | 0.6 | 1.0 | 0.5 | — | 0.3 | — | — | — | — | — |
| 31 | 0.6 | 0.5 | — | — | — | — | — | — | — | — |
| 32 | 0.6 | 0.5 | — | — | — | — | — | — | — | — |
| 33 | 0.6 | 0.5 | 0.5 | — | 0.3 | — | — | — | 0.005 | — |
| 34 | 0.6 | 0.5 | 0.5 | — | 0.3 | — | — | — | 0.01 | — |
| 35 | 0.6 | 0.5 | 0.5 | — | 0.3 | — | — | — | 0.01 | — |
| 36 | 0.6 | 0.5 | 0.5 | 0.02 | 0.2 | — | — | 0.02 | — | — |
| 37 | 0.6 | 0.5 | 0.3 | 0.05 | — | — | — | 0.02 | — | — |
| 38 | 0.6 | 0.5 | 0.1 | — | — | — | — | 0.2 | — | — |
| 39 | 0.6 | 0.5 | 1.5 | — | — | 0.1 | 0.2 | — | — | — |
| 40 | 0.6 | 0.5 | 1.0 | — | — | 0.1 | — | — | — | — |
| 41 | 0.6 | 0.5 | 0.5 | 0.5 | — | 0.1 | — | — | — | — |
| 42 | 0.6 | 0.5 | 0.5 | 0.5 | — | 0.1 | — | — | 0.05 | — |
| 43 | 0.6 | 0.5 | 0.5 | 0.3 | — | — | — | — | 0.05 | — |

TABLE 3-continued

| Specimen No. | Core material composition [wt %] | | | | | | | | | |
|---|---|---|---|---|---|---|---|---|---|---|
| | Si | Mg | Mn | Cu | Fe | Zr | Ti | Cr | Bi | Zn |
| 44 | 0.6 | 0.5 | 0.5 | 0.3 | 0.3 | — | — | — | 0.3 | — |
| 45 | 0.6 | 0.5 | 0.5 | 1.0 | 0.05 | — | — | — | 0.3 | — |
| 46 | 0.6 | 0.5 | 0.5 | 1.0 | 0.3 | — | — | — | 0.5 | — |
| 47 | 0.6 | 0.5 | 0.5 | — | 0.3 | — | — | — | 0.5 | — |
| 48 | 0.05 | 0.5 | 0.5 | — | 0.3 | — | — | — | — | — |
| 49 | 0.1 | 0.5 | 0.5 | — | 0.3 | — | — | — | — | — |
| 50 | 1.0 | 0.5 | 0.5 | — | 0.3 | — | — | — | — | — |
| 51 | 1.2 | 0.5 | 0.5 | — | 0.3 | — | — | — | — | 0.5 |
| 52 | 0.6 | 0.01 | 0.5 | 0.2 | 0.5 | — | — | — | — | 0.5 |
| 53 | 0.6 | 0.05 | 0.5 | 0.2 | 0.5 | — | — | — | — | 0.3 |
| 54 | 0.6 | 1.0 | 0.5 | 0.2 | — | — | — | — | — | 0.2 |
| 55 | 0.6 | 2.0 | 0.5 | — | — | — | 0.1 | — | — | — |
| 56 | 0.6 | 0.5 | 0.5 | — | — | — | 0.1 | — | — | — |
| 57 | 0.6 | 0.5 | 0.5 | — | — | — | 0.1 | — | — | — |
| 58 | 0.6 | 0.5 | 0.5 | — | — | — | 0.1 | — | — | — |
| 59 | 0.6 | 1.0 | 0.5 | — | 0.3 | — | — | — | — | — |
| 60 | 0.6 | 1.0 | 0.5 | — | 0.3 | — | — | — | — | — |
| 81 | 0.6 | 0.5 | 0.5 | — | 0.3 | — | — | — | 0.01 | — |
| 82 | 0.6 | 0.5 | 0.3 | — | 0.3 | — | — | — | 0.01 | — |
| 83 | 0.6 | 0.5 | 0.5 | — | 0.3 | — | — | — | 0.005 | — |
| 84 | 0.6 | 0.0 | 0.5 | 0.2 | 0.5 | — | — | — | — | 0.5 |
| 85 | 0.6 | 0.5 | 0.5 | — | 0.3 | — | — | — | 0.5 | — |

TABLE 4

| | Specimen No. | Core material composition [wt %] | | | | | | | | | |
|---|---|---|---|---|---|---|---|---|---|---|---|
| | | Si | Mg | Mn | Cu | Fe | Zr | Ti | Cr | Bi | Zn |
| Comparative Example | 61 | 0.6 | 0.5 | — | — | — | — | — | — | — | — |
| | 62 | 0.6 | 0.5 | — | — | — | — | — | — | — | — |
| | 63 | 0.6 | 0.5 | 0.5 | — | 0.3 | — | — | — | 0.01 | — |
| | 64 | 0.6 | 0.5 | 0.5 | 0.02 | 0.2 | — | — | 0.02 | — | — |
| | 65 | 0.6 | 0.5 | 1.5 | — | — | 0.1 | — | 0.2 | — | — |
| | 66 | 0.6 | 0.5 | 1.0 | — | — | 0.1 | — | — | — | — |
| | 67 | 0.6 | 0.5 | 0.5 | 0.3 | — | — | — | — | 0.05 | — |
| | 68 | 0.6 | 0.5 | 0.5 | 0.3 | 0.3 | — | — | — | 0.3 | — |
| | 69 | 0.6 | 0.5 | 0.5 | 1.0 | 0.05 | — | — | — | 0.3 | — |
| | 70 | 0.6 | 0.5 | 0.5 | 1.0 | 0.3 | — | — | — | 0.5 | — |
| | 71 | 0.6 | 0.5 | 0.5 | — | 0.3 | — | — | — | 0.5 | — |
| | 72 | 0.05 | 0.5 | 0.5 | — | 0.3 | — | — | — | — | — |
| Reference Example | 73 | 1.5 | 0.5 | 0.2 | 1.0 | 0.2 | — | — | — | — | — |
| | 74 | 0.5 | 2.1 | 0.5 | 0.5 | 0.2 | — | — | — | — | — |
| | 75 | 0.5 | 0.5 | 2.6 | 0.5 | 0.2 | — | — | — | — | — |
| | 76 | 0.5 | 0.5 | 0.1 | 2.6 | 0.2 | — | — | — | — | — |
| | 77 | 0.5 | 0.5 | 1.5 | 0.5 | 1.6 | — | — | — | — | — |
| | 78 | 0.8 | 0.5 | — | 0.5 | 0.2 | 0.3 | 0.32 | — | — | — |
| | 79 | 0.5 | 0.5 | — | 0.5 | 0.2 | — | 0.21 | 0.51 | — | — |
| | 80 | 1.1 | 0.5 | — | 1.2 | 0.2 | — | — | — | — | 9.1 |

TABLE 5

| | Specimen No. | Sacrificial material composition [wt %] | | | | | | | | |
|---|---|---|---|---|---|---|---|---|---|---|
| | | Zn | Si | Mg | Mn | Fe | Zr | Ti | Cr | Bi |
| Example | 1 | — | — | — | — | — | — | — | — | — |
| | 2 | — | — | — | — | — | — | — | — | — |
| | 3 | — | — | — | — | — | — | — | — | — |
| | 4 | — | — | — | — | — | — | — | — | — |
| | 5 | — | — | — | — | — | — | — | — | — |
| | 6 | — | — | — | — | — | — | — | — | — |
| | 7 | — | — | — | — | — | — | — | — | — |
| | 8 | — | — | — | — | — | — | — | — | — |
| | 9 | — | — | — | — | — | — | — | — | — |
| | 10 | — | — | — | — | — | — | — | — | — |
| | 11 | — | — | — | — | — | — | — | — | — |
| | 12 | — | — | — | — | — | — | — | — | — |
| | 13 | — | — | — | — | — | — | — | — | — |
| | 14 | — | — | — | — | — | — | — | — | — |
| | 15 | — | — | — | — | — | — | — | — | — |
| | 16 | — | — | — | — | — | — | — | — | — |
| | 17 | — | — | — | — | — | — | — | — | — |
| | 18 | — | — | — | — | — | — | — | — | — |
| | 19 | — | — | — | — | — | — | — | — | — |
| | 20 | — | — | — | — | — | — | — | — | — |
| | 21 | — | — | — | — | — | — | — | — | — |
| | 22 | — | — | — | — | — | — | — | — | — |
| | 23 | — | — | — | — | — | — | — | — | — |
| | 24 | — | — | — | — | — | — | — | — | — |
| | 25 | — | — | — | — | — | — | — | — | — |
| | 26 | — | — | — | — | — | — | — | — | — |
| | 27 | — | — | — | — | — | — | — | — | — |
| | 28 | — | — | — | — | — | — | — | — | — |
| | 29 | — | — | — | — | — | — | — | — | — |
| | 30 | — | — | — | — | — | — | — | — | — |

TABLE 5-continued

| Specimen No. | Zn | Si | Mg | Mn | Fe | Zr | Ti | Cr | Bi |
|---|---|---|---|---|---|---|---|---|---|
| 31 | 3.0 | — | — | — | — | — | — | — | — |
| 32 | 3.0 | — | — | — | — | — | — | — | — |
| 33 | 3.0 | 0.5 | — | 0.5 | — | — | — | — | — |
| 34 | 3.0 | 0.5 | — | 0.5 | — | — | — | — | — |
| 35 | 1.0 | 0.5 | — | 0.5 | — | — | — | — | — |
| 36 | 8.0 | 0.5 | — | 0.5 | — | — | — | — | — |
| 37 | 3.0 | 0.5 | — | 0.4 | — | 0.1 | — | — | — |
| 38 | 3.0 | 0.5 | — | 0.4 | — | 0.1 | — | — | — |
| 39 | 3.0 | 0.5 | — | 1.0 | — | 0.1 | — | — | — |
| 40 | 3.0 | 0.5 | 0.3 | 1.0 | — | 0.1 | — | — | — |
| 41 | 3.0 | — | 0.3 | — | — | — | 0.1 | — | — |
| 42 | 3.0 | — | 0.3 | — | — | — | 0.1 | — | — |
| 43 | 3.0 | — | 0.3 | — | — | — | 0.1 | — | — |
| 44 | 3.0 | — | 1.0 | — | 0.2 | — | 0.1 | — | — |
| 45 | 3.0 | — | 1.0 | — | 0.2 | — | — | 0.1 | — |
| 46 | 3.0 | — | 1.0 | — | 0.2 | — | — | 0.1 | — |
| 47 | 3.0 | — | 1.0 | — | 0.2 | — | — | 0.1 | 0.05 |
| 48 | 3.0 | — | — | — | 0.5 | — | — | 0.1 | 0.05 |
| 49 | 3.0 | — | — | — | 0.5 | — | — | — | 0.05 |
| 50 | 3.0 | — | — | — | 0.5 | — | — | — | 0.05 |
| 51 | 3.0 | — | — | 0.5 | — | — | — | — | 0.5 |
| 52 | 3.0 | — | — | 0.5 | — | — | — | — | 0.5 |
| 53 | 3.0 | — | — | 0.5 | — | — | — | — | 0.5 |
| 54 | 3.0 | 0.5 | — | 1.5 | — | — | — | — | — |
| 55 | 3.0 | 0.5 | — | 1.5 | — | — | — | — | — |
| 56 | 3.0 | 0.5 | — | 0.5 | — | — | — | — | — |
| 57 | 3.0 | 0.5 | — | 0.5 | — | — | — | — | 0.3 |

TABLE 6

| | Specimen No. | Zn | Si | Mg | Mn | Fe | Zr | Ti | Cr | Bi |
|---|---|---|---|---|---|---|---|---|---|---|
| Comparative Example | 61 | — | — | — | — | — | — | — | — | — |
| | 62 | — | — | — | — | — | — | — | — | — |
| | 63 | — | — | — | — | — | — | — | — | — |
| | 64 | — | — | — | — | — | — | — | — | — |
| | 65 | — | — | — | — | — | — | — | — | — |
| | 66 | — | — | — | — | — | — | — | — | — |
| | 67 | — | — | — | — | — | — | — | — | — |
| | 68 | — | — | — | — | — | — | — | — | — |
| | 69 | — | — | — | — | — | — | — | — | — |
| | 70 | — | — | — | — | — | — | — | — | — |
| | 71 | — | — | — | — | — | — | — | — | — |
| | 72 | — | — | — | — | — | — | — | — | — |
| Reference Example | 73 | — | — | — | — | — | — | — | — | — |
| | 74 | — | — | — | — | — | — | — | — | — |
| | 75 | — | — | — | — | — | — | — | — | — |
| | 76 | — | — | — | — | — | — | — | — | — |
| | 77 | — | — | — | — | — | — | — | — | — |
| | 78 | — | — | — | — | — | — | — | — | — |
| | 79 | — | — | — | — | — | — | — | — | — |
| | 80 | — | — | — | — | — | — | — | — | — |

TABLE 7

| | Specimen No. | Brazing material Casting condition Molten metal temperature (° C.) | Homogenization condition Temperature and time (° C., h) | Hot rolling conditions Rolling time between 400° C. and 500° C. (min) | Equivalent strain ε | Finish temperature (° C.) | Cooling rate (° C./h) |
|---|---|---|---|---|---|---|---|
| Target range | A | 710 | 450° C., 5 h | 15 | 5.7 | 320 | 25 |
| | B | 715 | 450° C., 5 h | 14 | 5.4 | 334 | 21 |
| | C | 715 | 500° C., 2 h | 10 | 5.5 | 355 | 35 |
| | D | 725 | 550° C., 2 h | 14 | 5.5 | 274 | 28 |
| | E | 725 | 400° C., 8 h | 18 | 5.9 | 290 | 38 |
| | F | 735 | 400° C., 8 h | 22 | 5.7 | 252 | 35 |
| | G | 735 | 450° C., 8 h | 15 | 6.1 | 315 | 42 |
| | H | 720 | 450° C., 8 h | 24 | 5 | 340 | 34 |
| | I | 755 | 500° C., 5 h | 14 | 6.4 | 347 | 52 |
| | J | 745 | 500° C., 5 h | 30 | 5 | 290 | 32 |
| | P | 700 | 400° C., 8 h | 22 | 5.7 | 260 | 40 |
| | Q | 690 | 400° C., 8 h | 21 | 5.7 | 270 | 42 |
| | R | 700 | 420° C., 5 h | 14 | 5.2 | 334 | 18 |
| Outside the target | K | 695 | 400° C., 8 h | 15 | 5.3 | 267 | 18 |
| | L | 680 | 380° C., 8 h | 8 | 5.2 | 220 | 12 |
| | M | 715 | 380° C., 8 h | 22 | 4.8 | 337 | 36 |
| | N | 670 | 350° C., 8 h | 15 | 4.6 | 395 | 22 |
| | O | 705 | 350° C., 8 h | 7 | 5.7 | 322 | 35 |

TABLE 5-continued

| Specimen No. | Zn | Si | Mg | Mn | Fe | Zr | Ti | Cr | Bi |
|---|---|---|---|---|---|---|---|---|---|
| 58 | 3.0 | 0.5 | — | 0.5 | — | — | — | — | 0.3 |
| 59 | 3.0 | 0.5 | — | 0.5 | — | — | — | — | 0.3 |
| 60 | 3.0 | 0.5 | — | 0.5 | — | — | — | — | 0.3 |
| 81 | — | — | — | — | — | — | — | — | — |
| 82 | — | — | — | — | — | — | — | — | — |
| 83 | — | — | — | — | — | — | — | — | — |
| 84 | — | — | — | — | — | — | — | — | — |
| 85 | — | — | — | — | — | — | — | — | — |

TABLE 8

| | Specimen No. | Braxability Joint ratio | Fillet length | Strength after brazing [MPa] | Corrosion resistance |
|---|---|---|---|---|---|
| Example | 1 | C | C | 136 | — |
| | 2 | B | B | 136 | — |
| | 3 | C | B | 157 | — |
| | 4 | C | C | 159 | — |
| | 5 | B | C | 152 | — |
| | 6 | B | C | 152 | — |
| | 7 | A | A | 148 | — |
| | 8 | A | B | 143 | — |

TABLE 8-continued

| Specimen No. | Braxability Joint ratio | Braxability Fillet length | Strength after brazing [MPa] | Corrosion resistance |
|---|---|---|---|---|
| 9 | A | B | 166 | — |
| 10 | A | A | 159 | — |
| 11 | A | B | 165 | — |
| 12 | A | A | 165 | — |
| 13 | A | A | 158 | — |
| 14 | A | A | 163 | — |
| 15 | A | A | 187 | — |
| 16 | A | A | 189 | — |
| 17 | A | B | 151 | — |
| 18 | A | A | 128 | — |
| 19 | A | B | 130 | — |
| 20 | A | A | 164 | — |
| 21 | B | B | 172 | — |
| 22 | C | C | 134 | — |
| 23 | B | C | 137 | — |
| 24 | A | B | 182 | — |
| 25 | A | C | 221 | — |
| 26 | A | C | 151 | — |
| 27 | A | A | 148 | — |
| 28 | A | A | 151 | — |
| 29 | A | B | 175 | — |
| 30 | A | B | 173 | — |
| 31 | C | C | 143 | A |
| 32 | B | B | 143 | A |
| 33 | C | B | 164 | A |
| 34 | C | C | 166 | A |
| 35 | B | C | 159 | B |
| 36 | B | C | 159 | B |
| 37 | A | A | 155 | A |
| 38 | A | B | 150 | A |
| 39 | A | B | 173 | A |
| 40 | A | A | 166 | A |
| 41 | A | A | 172 | A |
| 42 | A | B | 172 | A |
| 43 | A | A | 165 | A |
| 44 | A | A | 170 | A |
| 45 | A | A | 194 | A |
| 46 | A | A | 196 | A |
| 47 | A | B | 158 | A |
| 48 | A | A | 135 | A |
| 49 | A | B | 137 | A |
| 50 | A | A | 171 | A |
| 51 | B | B | 179 | A |
| 52 | C | C | 141 | A |
| 53 | B | C | 144 | A |
| 54 | A | B | 189 | A |
| 55 | A | C | 228 | A |
| 56 | A | C | 158 | A |
| 57 | A | A | 155 | A |
| 58 | A | A | 138 | A |
| 59 | A | B | 182 | A |
| 60 | A | B | 180 | A |
| 81 | C | C | 152 | — |
| 82 | C | C | 152 | — |
| 83 | C | C | 157 | — |
| 84 | B | B | 134 | — |
| 85 | A | C | 151 | — |

TABLE 9

| Specimen No. | Brazability Joint ratio | Brazability Fillet length | Strength after brazing [MPa] | Corrosion resistance |
|---|---|---|---|---|
| Comparative Example 61 | D | D | 143 | — |
| 62 | Cannot be evaluated due to improper production | | | — |
| 63 | C | D | 159 | — |
| 64 | Cannot be evaluated due to improper production | | | — |
| 65 | D | D | 173 | — |
| 66 | Cannot be evaluated due to improper production | | | — |
| 67 | C | D | 164 | — |
| 68 | D | D | 170 | — |
| 69 | C | D | 193 | — |
| 70 | D | D | 196 | — |
| 71 | D | D | 157 | — |
| 72 | D | D | 135 | — |
| Reference Example 73 | Core material melted during brazing | | | — |
| 74 | Cannot be evaluated due to improper production | | | — |
| 75 | Cannot be evaluated due to improper production | | | — |
| 76 | Cannot be evaluated due to improper production | | | — |
| 77 | Cannot be evaluated due to improper production | | | — |
| 78 | Cannot be evaluated due to improper production | | | — |
| 79 | Cannot be evaluated due to improper production | | | — |
| 80 | Core material melted during brazing | | | — |

REFERENCE TO DEPOSITED BIOLOGICAL MATERIAL

1 aluminum brazing sheet
2 aluminum alloy core material (aluminum alloy core material layer)
3 aluminum alloy brazing material (aluminum alloy brazing material layer)
4 target member
5 aluminum heat exchanger
6 fin
7 tube
10 sacrificial material (sacrificial material layer)
13 joint
15 tube

The invention claimed is:
1. An aluminum brazing sheet, comprising:
a first layer comprising a core material; and
a brazing material layer comprising an Al—Si—Mg—Bi alloy,
wherein the Al—Si—Mg—Bi alloy comprises, by mass %,
Al,
Mg in a range of from 0.01 to 2.0%,
Si in a range of from 1.5 to 14.0%, and
Bi in a range of from 0.005 to 1.5%,
wherein the brazing material layer is clad on one surface or both surfaces of the core material at an outermost surface of the aluminum brazing sheet,
wherein, in the brazing material layer, there are more than 10 Mg—Bi-based compounds having a diameter in a range of from 0.01 to less than 5.0 μm, in terms of equivalent circle diameter, per 10,000-μm² visual field when observed in a surface layer plane direction,
wherein, in the brazing material layer, there are less than 2 Mg—Bi-based compounds having a diameter of 5.0 μm or more per 10,000-μm² visual field, and
wherein, in the brazing material layer, there are less than 5 Bi particles, consisting of Bi, having a diameter of 5.0 μm or more, in terms of equivalent circle diameter, per 10,000-μm² visual field when observed in the surface layer plane direction.
2. The aluminum brazing sheet of claim 1, wherein, in the brazing material layer, a number of Si particles having a diameter of 1.75 μm or more, in terms of equivalent circle diameter, is 25% or more with respect to a number of Si particles having a diameter of 0.8 µm or more, in terms of equivalent circle diameter when observed in the surface layer plane direction, and wherein the Si particles are particles consisting of Si or particles primarily comprising Fe and Si.

3. The aluminum brazing sheet of claim 1, wherein, in the brazing material layer, an area ratio of Si particles having a diameter of 1.75 µm or more, in terms of equivalent circle diameter with respect to a surface area of all the Si particles, is in a range of from 0.1 to 1.5%, and wherein the Si particles are particles consisting of Si or particles primarily comprising Fe and Si.

4. The aluminum brazing sheet of claim 1, wherein in the brazing material layer, a Mg/Bi atomic composition ratio between Mg and Bi is 1.5 or more.

5. The aluminum brazing sheet of claim 1, wherein in the brazing material layer, a Ca content as impurities is 100 ppm or less in terms of mass.

6. The aluminum brazing sheet of claim 1, wherein the Al—Si—Mg—Bi alloy further comprises Zn in a range of from 0.1 to 9.0 mass %.

7. The aluminum brazing sheet of claim 1, wherein the core material comprises, by mass %:
the Si in a range of from 0.05 to 1.2%;
the Mg in a range of from 0.01 to 2.0%;
Mn in a range of from 0.1 to 2.5%;
Cu in a range of from 0.01 to 2.5%;
Fe in a range of from 0.05 to 1.5%;
Zr in a range of from 0.01 to 0.3%;
Ti in a range of from 0.01 to 0.3%;
Cr in a range of from 0.01 to 0.5%;
Bi in a range of from 0.005 to 1.5%; and/or
Zn in a range of from 0.1 to 9.0%.

8. The aluminum brazing sheet of claim 1, wherein the core material comprises, by mass %:
the Si in a range of from 0.05 to 1.2%; and
the Mg in a range of from 0.01 to 2.0%, and
wherein the core material further comprises, by mass %:
Mn in a range of from 0.1 to 2.5%;
Cu in a range of from 0.01 to 2.5%;
Fe in a range of from 0.05 to 1.5%;
Zr in a range of from 0.01 to 0.3%;
Ti in a range of from 0.01 to 0.3%;
Cr in a range of from 0.01 to 0.5%;
Bi in a range of from 0.005 to 1.5%; and/or
Zn in a range of from 0.1 to 9.0%.

9. The aluminum brazing sheet of claim 1, wherein the first layer is clad with a sacrificial material, and
wherein the sacrificial material comprises, by mass %:
Al, and
Zn in a range of from 0.1 to 9.0%, and
wherein the sacrificial material further comprises, by mass %:
Si in a range of from 0.05 to 1.2%;
Mg in a range of from 0.01 to 2.0%;
Mn in a range of from 0.1 to 2.5%;
Fe in a range of from 0.05 to 1.5%;
Zr in a range of from 0.01 to 0.3%;
Ti in a range of from 0.01 to 0.3%;
Cr in a range of from 0.01 to 0.5%; and/or
Bi in a range of from 0.005 to 1.5%.

10. The aluminum brazing sheet of claim 2, wherein, in the brazing material layer, an area ratio of the Si particles having a diameter of 1.75 µm or more, in terms of equivalent circle diameter, with respect to a surface area of all the Si particles, is in a range of from 0.1 to 1.5%.

11. The aluminum brazing sheet of claim 2, wherein, in the Al—Si—Mg—Bi alloy, a Mg/Bi atomic composition ratio between Mg and Bi is 1.5 or more.

12. The aluminum brazing sheet of claim 3, wherein in the Al—Si—Mg—Bi alloy, a Mg/Bi atomic composition ratio between Mg and Bi is 1.5 or more.

13. The aluminum brazing sheet of claim 10, wherein in the Al—Si—Mg—Bi alloy, a Mg/Bi atomic composition ratio between Mg and Bi is 1.5 or more.

14. The aluminum brazing sheet of claim 2, wherein the core material comprises, by mass %:
the Si in a range of from 0.05 to 1.2%;
the Mg in a range of from 0.01 to 2.0%;
Mn in a range of from 0.1 to 2.5%;
Cu in a range of from 0.01 to 2.5%;
Fe in a range of from 0.05 to 1.5%;
Zr in a range of from 0.01 to 0.3%;
Ti in a range of from 0.01 to 0.3%;
Cr in a range of from 0.01 to 0.5%;
Bi in a range of from 0.005 to 1.5%; and/or
Zn in a range of from 0.1 to 9.0%.

15. The aluminum brazing sheet of claim 3, wherein the core material further comprises, by mass %:
the Si in a range of from 0.05 to 1.2%;
the Mg in a range of from 0.01 to 2.0%;
Mn in a range of from 0.1 to 2.5%;
Cu in a range of from 0.01 to 2.5%;
Fe in a range of from 0.05 to 1.5%;
Zr in a range of from 0.01 to 0.3%;
Ti in a range of from 0.01 to 0.3%;
Cr in a range of from 0.01 to 0.5%;
Bi in a range of from 0.005 to 1.5%; and/or
Zn in a range of from 0.1 to 9.0%.

16. The aluminum brazing sheet of claim 10, wherein the core material comprises, by mass %:
the Si in a range of from 0.05 to 1.2%;
the Mg in a range of from 0.01 to 2.0%;
Mn in a range of from 0.1 to 2.5%;
Cu in a range of from 0.01 to 2.5%;
Fe in a range of from 0.05 to 1.5%;
Zr in a range of from 0.01 to 0.3%;
Ti in a range of from 0.01 to 0.3%;
Cr in a range of from 0.01 to 0.5%;
Bi in a range of from 0.005 to 1.5%; and/or
Zn in a range of from 0.1 to 9.0%.

17. The aluminum brazing sheet of claim 2, wherein the core material comprises, by mass %:
the Si in a range of from 0.05 to 1.2%; and
the Mg in a range of from 0.01 to 2.0%, and
wherein the core material further comprises, by mass %:
Mn in a range of from 0.1 to 2.5%;
Cu in a range of from 0.01 to 2.5%;
Fe in a range of from 0.05 to 1.5%;
Zr in a range of from 0.01 to 0.3%;
Ti in a range of from 0.01 to 0.3%;
Cr in a range of from 0.01 to 0.5%;
Bi in a range of from 0.005 to 1.5%; and/or
Zn in a range of from 0.1 to 9.0%.

18. The aluminum brazing sheet of claim 2, wherein the first layer is clad with a sacrificial material, and
wherein the sacrificial material comprises, by mass %:
Al, and
Zn in a range of from 0.1 to 9.0%, and
wherein the sacrificial material further comprises, by mass %:
Si in a range of from 0.05 to 1.2%;
Mg in a range of from 0.01 to 2.0%;

Mn in a range of from 0.1 to 2.5%;
Fe in a range of from 0.05 to 1.5%;
Zr in a range of from 0.01 to 0.3%;
Ti in a range of from 0.01 to 0.3%;
Cr in a range of from 0.01 to 0.5%; and/or
Bi in a range of from 0.005 to 1.5%.

19. The aluminum brazing sheet of claim 3, wherein the first layer is clad with a sacrificial material, and
wherein the sacrificial material comprises, by mass %:
Al, and
Zn in a range of from 0.1 to 9.0%, and
wherein the sacrificial material further comprises, by mass %:
Si in a range of from 0.05 to 1.2%;
Mg in a range of from 0.01 to 2.0%;
Mn in a range of from 0.1 to 2.5%;
Fe in a range of from 0.05 to 1.5%;
Zr in a range of from 0.01 to 0.3%;
Ti in a range of from 0.01 to 0.3%;
Cr in a range of from 0.01 to 0.5%; and/or
Bi in a range of from 0.005 to 1.5%.

20. The aluminum brazing sheet of claim 10, wherein the first layer is clad with a sacrificial material, and
wherein the sacrificial material comprises, by mass %:
Al, and
Zn in a range of from 0.1 to 9.0%, and
wherein the sacrificial material further comprises, by mass %:
Si in a range of from 0.05 to 1.2%;
Mg in a range of from 0.01 to 2.0%;
Mn in a range of from 0.1 to 2.5%;
Fe in a range of from 0.05 to 1.5%;
Zr in a range of from 0.01 to 0.3%;
Ti in a range of from 0.01 to 0.3%;
Cr in a range of from 0.01 to 0.5%; and/or
Bi in a range of from 0.005 to 1.5%.

* * * * *